United States Patent
Saigusa et al.

(10) Patent No.: US 7,378,135 B2
(45) Date of Patent: May 27, 2008

(54) POLYMERIZABLE LIQUID CRYSTAL COMPOSITION AND OPTICALLY ANISOTROPIC THIN FILM

(75) Inventors: Kazuhiko Saigusa, Chiba (JP); Maiko Ito, Chiba (JP); Ryushi Shundo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 115 days.

(21) Appl. No.: 11/391,194

(22) Filed: Mar. 29, 2006

(65) Prior Publication Data

US 2006/0222784 A1   Oct. 5, 2006

(30) Foreign Application Priority Data

Mar. 29, 2005   (JP) .............................. 2005-094448

(51) Int. Cl.
*C09K 19/32* (2006.01)
*C09K 19/20* (2006.01)
*C09K 19/38* (2006.01)

(52) U.S. Cl. ..................... 428/1.1; 428/1.3; 428/1.31; 252/299.01; 252/299.62; 252/299.67

(58) Field of Classification Search ................ 428/1.1, 428/1.3, 1.31; 252/299.61, 299.62, 299.63, 252/299.67, 299.01
See application file for complete search history.

(56) References Cited

U.S. PATENT DOCUMENTS

| | | | | |
|---|---|---|---|---|
| 6,824,709 B2* | 11/2004 | Shundo | ............... | 252/299.62 |
| 7,101,595 B2* | 9/2006 | Shundo et al. | ............... | 428/1.1 |
| 7,157,124 B2* | 1/2007 | Sasada et al. | ............... | 428/1.1 |
| 7,300,604 B2* | 11/2007 | Shundo | ............... | 252/299.61 |

FOREIGN PATENT DOCUMENTS

JP    2004-204190    7/2004

OTHER PUBLICATIONS

English translation by computer for JP 2004-204190, http://www4.ipdl.inpit.go.jp/Tokujitu/PAJdetail.ipdl?N0000=60&N0120=01&N2001=2&N3001=2004-204190.*

* cited by examiner

*Primary Examiner*—Shean C Wu
(74) *Attorney, Agent, or Firm*—Wenderoth, Lind & Ponack, L.L.P.

(57) ABSTRACT

In order to obtain such a liquid crystal thin film having optical anisotropy that suffers less change in optical characteristics thereof under heating to 200° C., the following polymerizable liquid crystal composition is provided as a raw material therefor. The composition contains Compound (1) and at least one of Compound (2) and Compound (3), with a proportion of Compound (1) being from 50 to 99% by weight, a proportion of Compound (2) being from 0 to 50% by weight, and a proportion of Compound (3) being from 0 to 50% by weight:

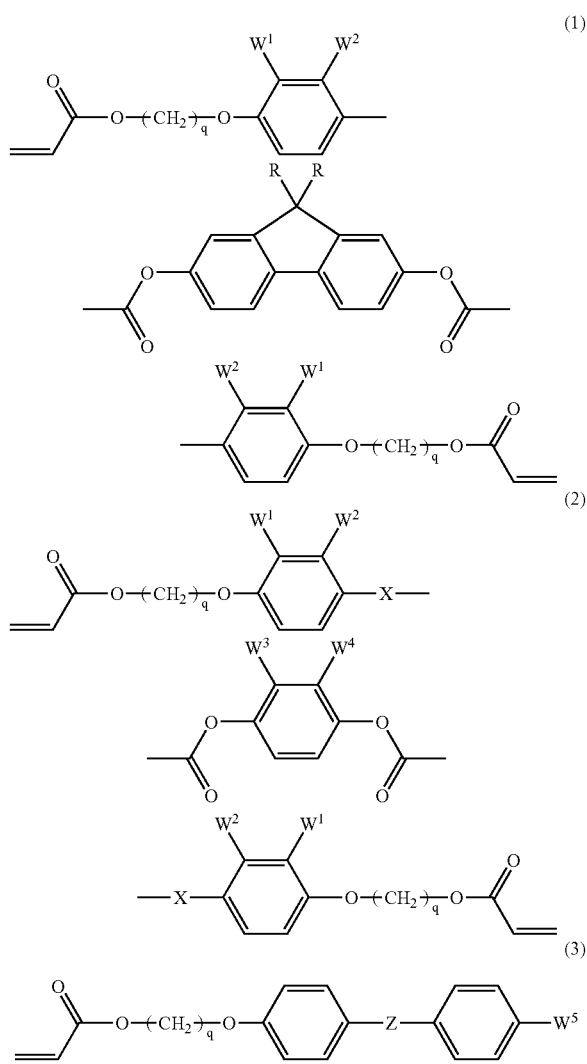

wherein R is alkyl; each of $W^1$ and $W^2$ is independently hydrogen, chlorine, fluorine or —$CH_3$; each of $W^3$ and $W^4$ is independently hydrogen, chlorine, fluorine, —$CH_3$ or —$CF_3$; $W^5$ is alkyl having, alkoxy, chlorine, fluorine, —CN or —$OCF_3$; X is a single bond, —CH=CH— or —$CH_2CH_2$—; Z is a single bond, —COO—, —OCO— or —$CH_2CH_2$—; and q is an integer of from 1 to 20.

30 Claims, 6 Drawing Sheets

POLYMERIZABLE LIQUID CRYSTAL COMPOSITION AND OPTICALLY ANISOTROPIC THIN FILM

FIELD OF THE INVENTION

The present invention relates to a polymerizable liquid crystal composition containing an acrylate derivative having a 9,9-dialkylfluorene skeleton, and also relates to a polymerizable liquid crystal layer and a liquid crystal thin film obtained from the composition. The invention further relates to an optical device, a polarizing plate, a phase retardation film, and a display device having these products.

BACKGROUND OF THE INVENTION

In recent years, it has been proposed that a polarizing plate, a phase retardation film and the like utilizing a liquid crystal having a polymerizable group are applied to an optical device. The optical device is obtained in such a manner that a polymerizable liquid crystal having optical anisotropy is polymerized in a liquid crystal state, followed by fixing the state. Accordingly, polymers having various types of optical anisotropy can be obtained by fixing the alignment state of the liquid crystal skeleton to such an alignment state as homogeneous alignment, hybrid alignment, homeotropic alignment and twisted alignment. In the following description, expressing the aforementioned alignment states may be referred to as "having homogeneous alignment", "having hybrid alignment", "having homeotropic alignment" or "having twisted alignment".

A polymer having homogeneous alignment can be used by combining with a half wavelength plate, a quarter wavelength plate or a film having other optical functionality. A polymer having hybrid alignment can be applied, for example, to a viewing angle compensation plate in a TN (twisted nematic) mode. A polymer having homeotropic alignment can be combined, for example, with a film having other optical functionality to improve the viewing angle characteristics of a polarizing plate. A film of the polymer having homeotropic alignment has an optical axis in the $n_z$ direction and has a refractive index in the optical axis larger than the refractive index in the direction perpendicular thereto, and therefore, the film is classified to a positive C-plate in terms of optical indicatrix. The positive C-plate can be applied to improvement in optical compensation of a mode of a horizontally aligned liquid crystal display, i.e., a so-called IPS (in-plane switching) mode, for example, improvement in viewing angle characteristics of a polarizing plate.

In all the aforementioned uses, a liquid crystal thin film having optical anisotropy may be provided inside a liquid crystal cell or outside a liquid crystal cell. In the system having a liquid crystal provided outside a liquid crystal cell, the polymerizable liquid crystal composition may be applied on a film of TAC (triacetyl cellulose) or a polymer of a norbornene compound as a substrate in some cases.

In the case where a liquid crystal thin film having optical anisotropy is provided to a liquid crystal cell by polymerizing a polymerizable liquid crystal composition, the polymerizable liquid crystal composition is demanded to have the following characteristics. As the characteristics before polymerization, it is demanded to have a stable nematic phase at room temperature, exhibit uniform alignment property, and to attain easily various demanded alignment states. As the characteristics after polymerization, it is demanded to have good adhesion property to the substrate, and have suitable characteristic values thereof showing the optical anisotropy (such as retardation) and transparency corresponding to optical design. Furthermore, it is also demanded to have weather resistance (such as heat resistance, humidity resistance and light resistance) to prevent the characteristics from deterioration. In the case where the liquid crystal thin film is provided inside a liquid crystal cell, in particular, an overcoating layer, a transparent electrode and an alignment layer for a driving liquid crystal are provided on the liquid crystal thin film formed on the substrate, and therefore, the liquid crystal thin film is demanded to have such heat resistance that withstands the processing temperatures of the film forming processes and the heat history thereof to prevent the adhesion property of the liquid crystal thin film to the layers, the characteristic values thereof showing the optical anisotropy, the thickness thereof, and the transparency thereof from being changed beyond the tolerance levels.

As a polymerizable liquid crystal composition attaining the aforementioned demands, a polymerizable liquid crystal composition that contains an acrylate derivative having a 9-monoalkylfluorene skeleton has been proposed (as described in JP-A-2004-204190). However, the acrylate derivative having a 9-monoalkylfluorene skeleton has a chemically unstable structure, and various problems occur particularly in production of a liquid crystal display device having a liquid crystal thin film provided inside a liquid crystal cell. Namely, the characteristic values showing the optical anisotropy are changed, the thickness is significantly decreased, and the thin film is colored (yellow discoloration) to deteriorate transparency, and improvements thereof have been demanded accordingly.

SUMMARY OF THE INVENTION

An object of the invention is to obtain such a liquid crystal thin film having optical anisotropy that suffers less change in optical characteristics thereof, for example, under heating to 200° C. for obtaining the liquid crystal thin film by polymerizing a polymerizable liquid crystal composition. In particular, such a polymerizable liquid crystal composition is to be provided that is capable of forming an optically anisotropic liquid crystal thin film layer inside a liquid crystal cell. Such a polymerizable liquid crystal composition is to be provided that the liquid crystal thin film formed has a liquid crystal skeleton having such an alignment state as homogeneous alignment, hybrid alignment or homeotropic alignment. Another object of the invention is to provide the liquid crystal thin film and an optical device using the liquid crystal thin film. Still another object of the invention is to provide a display device, particularly a liquid crystal display device, containing an optical device using the liquid crystal thin film.

As a result of earnest investigations made by the inventors, it has been found that the aforementioned and other objects of the invention are accomplished by using, as a major component of a polymerizable liquid crystal composition, an acrylate derivative having a 9,9-dialkylfluorene skeleton, and thus the invention has been completed. The invention relates to a polymerizable liquid crystal composition of the following item [1].

[1] A polymerizable liquid crystal composition comprising a compound represented by Formula (1) and at least one of a compound represented by Formula (2) and a compound represented by Formula (3), with a proportion of the compound represented by Formula (1) being from 50 to 99% by weight, a proportion of the compound represented by Formula (2) being from 0 to 50% by weight, and a proportion of the compound represented by Formula (3) being from 0 to 50% by weight, based on a total amount of the compound represented by Formula (1), the compound represented by Formula (2) and the compound represented by Formula (3):

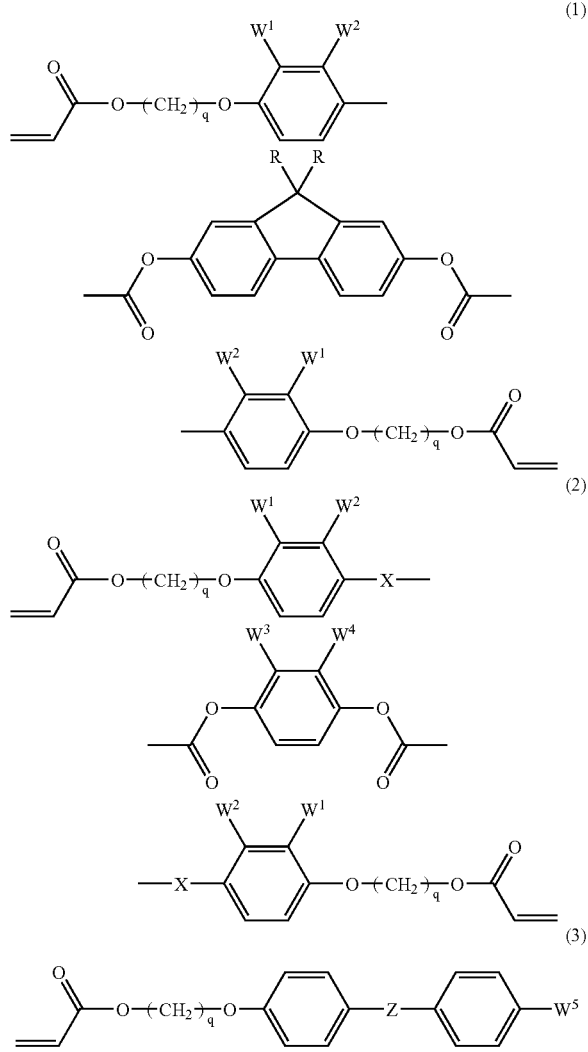

wherein R is alkyl having from 1 to 4 carbon atoms; each of $W^1$ and $W^2$ is independently hydrogen, chlorine, fluorine or —$CH_3$; each of $W^3$ and $W^4$ is independently hydrogen, chlorine, fluorine, —$CH_3$ or —$CF_3$; $W^5$ is alkyl having from 1 to 10 carbon atoms, alkoxy having from 1 to 10 carbon atoms, chlorine, fluorine, —CN or —$OCF_3$; X is a single bond, —CH=CH— or —$CH_2CH_2$—; Z is a single bond, —COO—, —OCO— or —$CH_2CH_2$—; and q is an integer of from 1 to 20.

The polymerizable liquid crystal composition of the invention has such characteristics that, for example, it is excellent in stability of a liquid crystal phase at room temperature, and it exhibits uniform alignment property before and after polymerization, and a liquid crystal layer or a liquid crystal thin film having optical anisotropy can be obtained from the polymerizable liquid crystal composition. The optically anisotropic liquid crystal thin film has excellent heat resistance. The heat resistance thereof enables formation of an optically anisotropic liquid crystal thin film layer inside a liquid crystal cell. A liquid crystal film having such an alignment state as homogeneous alignment, hybrid alignment or homeotropic alignment can be obtained from the polymerizable liquid crystal composition of the invention. The liquid crystal thin film of the invention can be applied to various kinds of optical devices, and the optical device can be applied to a display device, particularly a liquid crystal display device.

Figure 1:
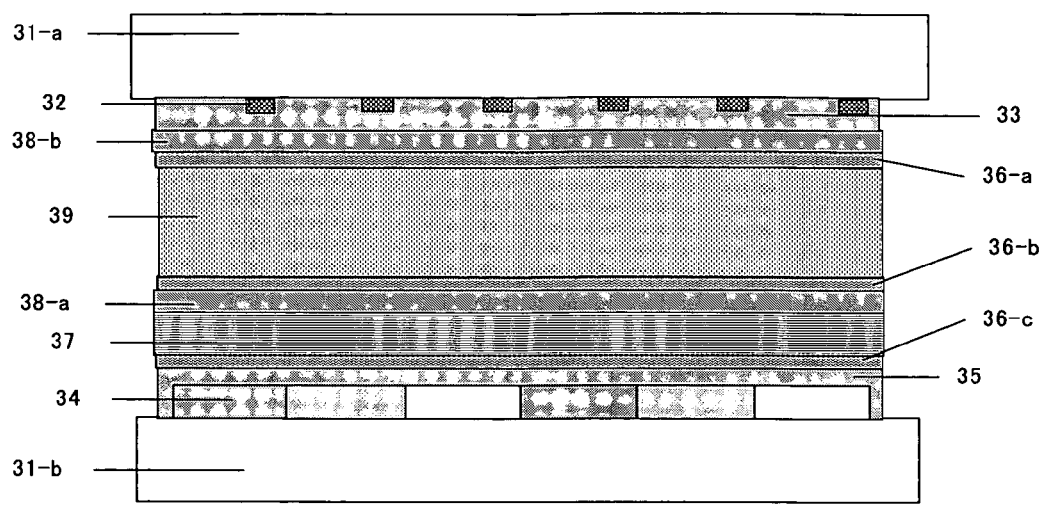
FIG. 1 is a diagram showing a constitution of example 1 of a liquid crystal cell (a liquid crystal cell having an optically anisotropic liquid crystal thin film formed inside the liquid crystal cell).

Symbols in the figures denote as follows.
31-a: (glass) substrate
31-b: (glass) substrate
31-a: (glass) substrate
31-a: (glass) substrate
31-b: (glass) substrate
32: TFT device
33: overcoating layer
34: color filter
35: overcoating layer
36-a: alignment layer
36-b: alignment layer
36-c: alignment layer
37: liquid crystal thin film obtained by aligning and polymerizing polymerizable liquid crystal composition
37-a: liquid crystal thin film obtained by aligning and polymerizing polymerizable liquid crystal composition 37-*b*: liquid crystal thin film obtained by aligning and polymerizing polymerizable liquid crystal composition
38-*a*: transparent electrode
38-*b*: transparent electrode
39: liquid crystal medium
40: overcoating layer

DETAILED DESCRIPTION OF THE INVENTION

The terms used herein will be described. The term "tilt angle" means an angle formed by an alignment state of a liquid crystal skeleton with respect to a plane of a substrate. The term "homogeneous alignment" means such an alignment state that the tilt angle is uniformly close to zero, particularly from 0 to 5°, from one interface to the other interface. The interface herein is a substrate interface having an alignment layer or a free interface. The term "hybrid alignment" means such an alignment state that the tilt angle continuously varies in a range of from 0 to 90°. The term "homeotropic alignment" means such an alignment that the tilt angle uniformly varies from 85 to 90° from one interface to the other interface. A compound represented by Formula (1) may be referred to as Compound (1) in some cases. The rule may be applied to compounds represented by the other formulae.

The invention is composed of the aforementioned item [1] and the following items [2] to [23].

[2] A polymerizable liquid crystal composition comprising a compound represented by Formula (4) and at least one of a compound represented by Formula (5) and a compound represented by Formula (6), with a proportion of the compound represented by Formula (4) being from 50 to 90% by weight, a proportion of the compound represented by Formula (5) being from 0 to 50% by weight, a proportion of the compound represented by Formula (6) being from 0 to 50% by weight, and a total proportion of the compound represented by Formula (5) and the compound represented by Formula (6) being from 10 to 50% by weight, based on a total amount of the compound represented by Formula (4), the compound represented by Formula (5) and the compound represented by Formula (6):

wherein $W^2$ is hydrogen or fluorine; and q is an integer of from 2 to 10.

[3] The polymerizable liquid crystal composition as described in the item [2], wherein the proportion of the compound represented by Formula (4) is from 50 to 80% by weight, the proportion of the compound represented by Formula (5) is from 10 to 40% by weight, the proportion of the compound represented by Formula (6) is from 10 to 40% by weight, and the total proportion of the compound represented by Formula (5) and the compound represented by Formula (6) is from 20 to 50% by weight.

[4] The polymerizable liquid crystal composition as described in the item [2], wherein the proportion of the compound represented by Formula (4) is from 50 to 80% by weight, the proportion of the compound represented by Formula (5) is from 10 to 40% by weight, the proportion of the compound represented by Formula (6) is from 10 to 40% by weight, the total proportion of the compound represented by Formula (5) and the compound represented by Formula (6) is from 20 to 50% by weight, and $W^2$ is hydrogen.

[5] The polymerizable liquid crystal composition as described in the item [2], wherein the proportion of the compound represented by Formula (4) is from 50 to 90% by weight, the proportion of the compound represented by Formula (5) is from 10 to 50% by weight, and the proportion of the compound represented by Formula (6) is 0% by weight.

[6] The polymerizable liquid crystal composition as described in the item [2], wherein the proportion of the compound represented by Formula (4) is from 50 to 90% by weight, the proportion of the compound represented by Formula (5) is 0% by weight, the proportion of the compound represented by Formula (6) is from 10 to 50% by weight.

[7] The polymerizable liquid crystal composition as described in any one of the items [1] to [6], wherein the composition further contains a compound represented by Formula (7), and a proportion of the compound represented by Formula (7) is from 1 to 20% by weight based on the total weight of the composition:

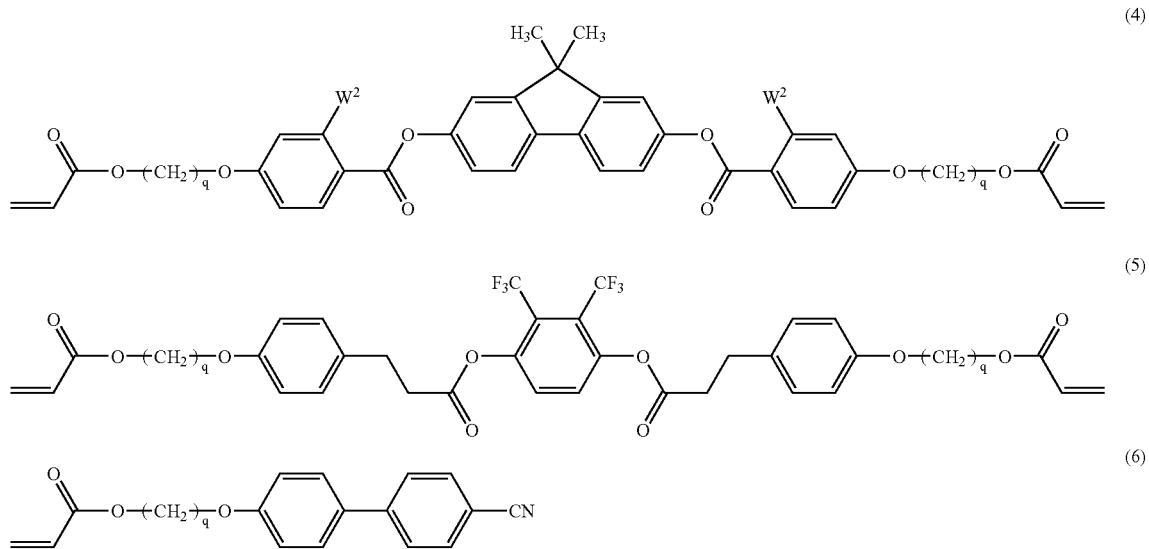

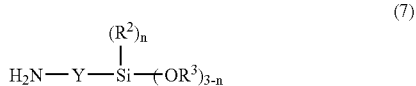

(7)

wherein $R^2$ is alkyl having from 1 to 8 carbon atoms; $R^3$ is alkyl having from 1 to 8 carbon atoms; Y is alkylene having from 1 to 20 carbon atoms; and n is an integer of from 0 to 2.

[8] The polymerizable liquid crystal composition as described in the item 7, wherein Y is trimethylene, $R^3$ is ethyl, and n is 0; and the proportion of the compound represented by Formula (7) is from 1 to 10% by weight.

[9] A polymerizable liquid crystal layer formed by applying the polymerizable liquid crystal composition as described in any one of the items 1 to 8 on a glass substrate.

[10] The polymerizable liquid crystal layer as described in the item 9, wherein the glass substrate is a glass substrate having a treated surface.

[11] The polymerizable liquid crystal layer as described in the item 10, wherein the glass substrate having a treated surface is a glass substrate having a polyimide alignment layer subjected to a rubbing treatment.

[12] A polymerizable liquid crystal layer formed by applying the polymerizable liquid crystal composition as described in any one of the items 3 to 5 on a glass substrate having a polyimide alignment layer subjected to a rubbing treatment, and having an alignment state of homogeneous alignment.

[13] A polymerizable liquid crystal layer formed by applying the polymerizable liquid crystal composition as described in the item 6 on a glass substrate having a polyimide alignment layer subjected to a rubbing treatment, and having an alignment state of hybrid alignment.

[14] A polymerizable liquid crystal layer formed by applying the polymerizable liquid crystal composition as described in the item 7 or 8 on a glass substrate, and having an alignment state of homeotropic alignment.

[15] An optically anisotropic liquid crystal thin film having fixed alignment obtained by polymerizing the polymerizable liquid crystal layer as described in any one of the items 12 to 14.

[16] The optically anisotropic liquid crystal thin film as described in the item 15, wherein the thickness of the film is from 0.05 to 5 μm.

[17] An optical device comprising the optically anisotropic liquid crystal thin film as described in the item 15.

[18] A phase retardation plate comprising the optically anisotropic liquid crystal thin film as described in the item 15.

[19] A polarizing plate comprising the optically anisotropic liquid crystal thin film as described in the item 15.

[20] An optical device comprising the phase retardation plate as described in the item 18 or the polarizing plate as described in the item 19.

[21] A display device comprising the phase retardation plate as described in the item 18 or the polarizing plate as described in the item 19.

[22] A liquid crystal display device comprising the phase retardation plate as described in the item 18 or the polarizing plate as described in the item 19.

[23] A liquid crystal display device comprising the optically anisotropic liquid crystal thin film as described in the item 15 formed on an inner surface of a liquid crystal cell.

The liquid crystal composition of the invention contains Compound (1), and at least one of Compound (2) and Compound (3):

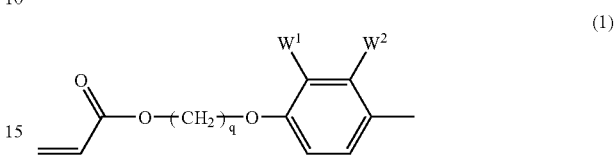

(1)

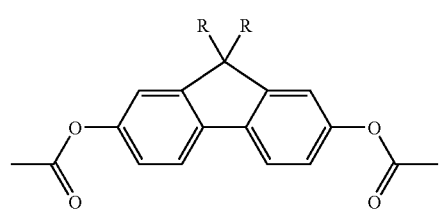

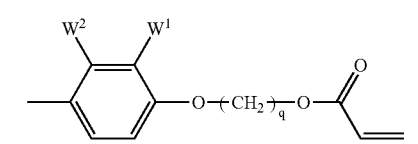

(2)

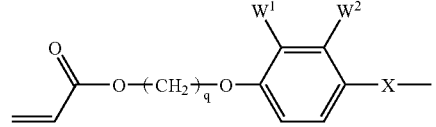

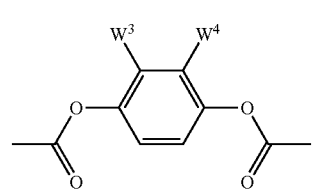

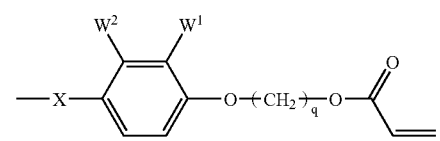

(3)

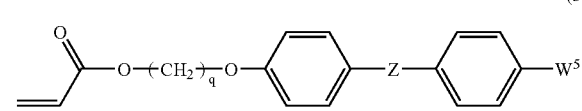

The symbols in these formulae have the meanings described hereinbefore.

R in Formula (1) is alkyl having from 1 to 4 carbon atoms. Preferred examples of R include methyl and ethyl, and methyl is the most preferred. Preferred examples of Compound (1) include Compound (4):

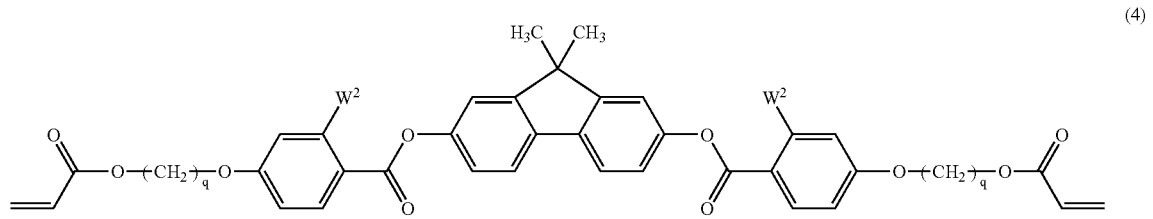

(4)

wherein $W^2$ is hydrogen or fluorine; and q is an integer of from 2 to 10.

Compound (4) has a wide temperature range of a liquid crystal phase and thus is used for controlling the liquid crystal temperature range of the composition. Compound (4) is excellent in compatibility with other polymerizable liquid crystal compounds, and thus the polymerizable liquid crystal composition can be favorably prepared by using the compound. Preferred examples of Compound (1) include the following compounds (1-1) to (1-16):

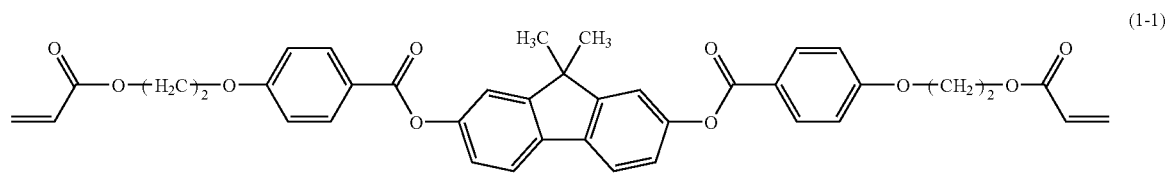

(1-1)

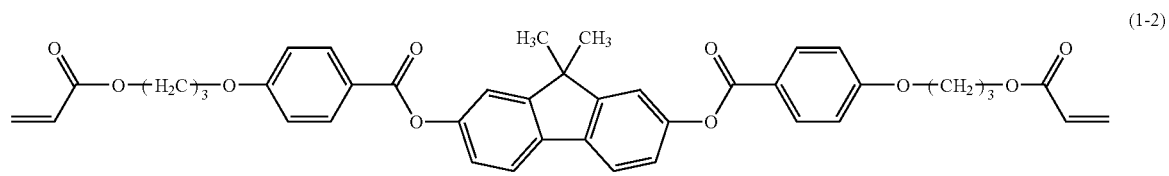

(1-2)

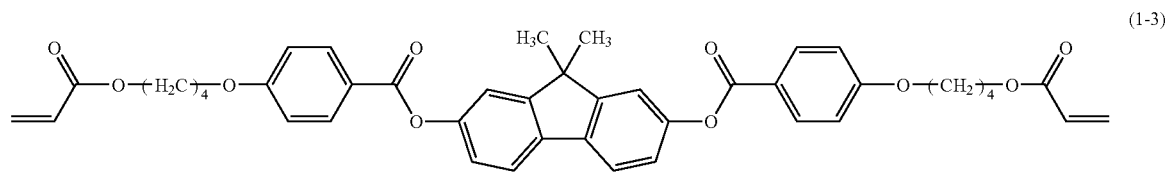

(1-3)

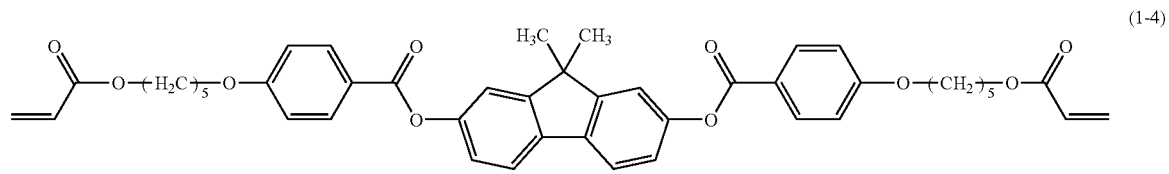

(1-4)

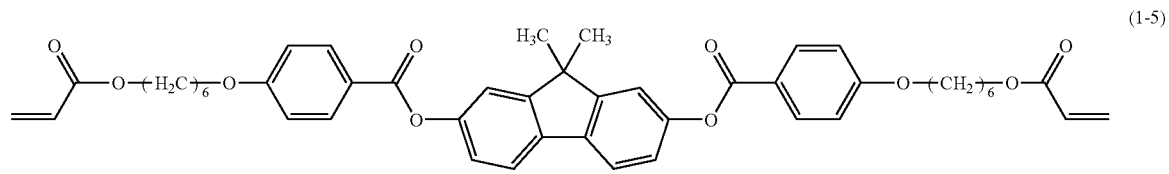

(1-5)

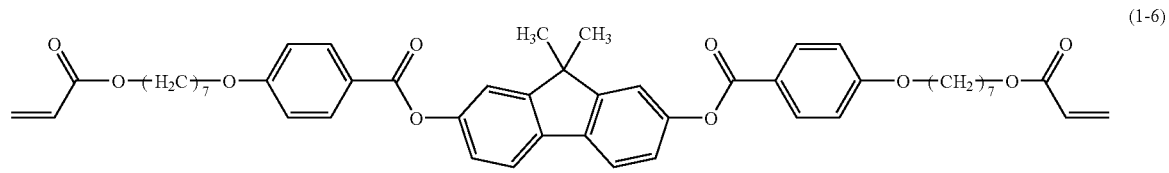

(1-6)

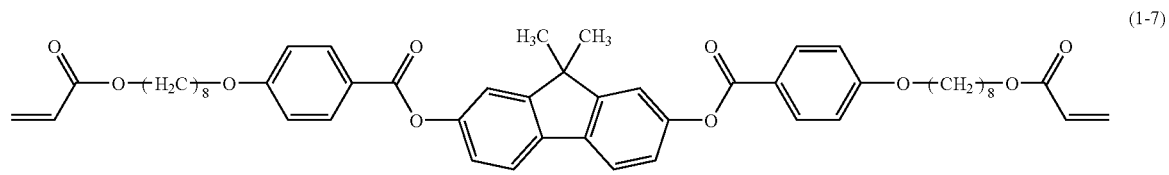

(1-7)

-continued
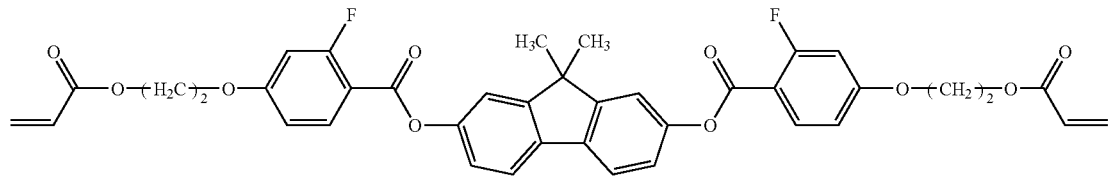
(1-8)
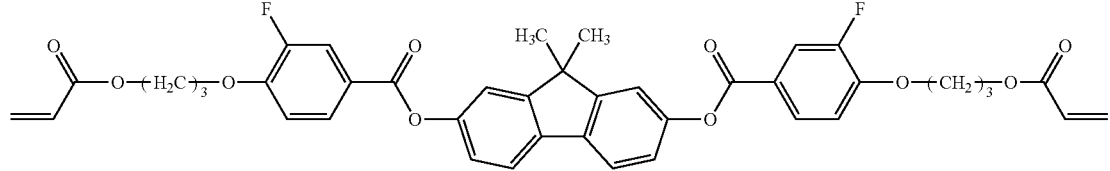
(1-9)
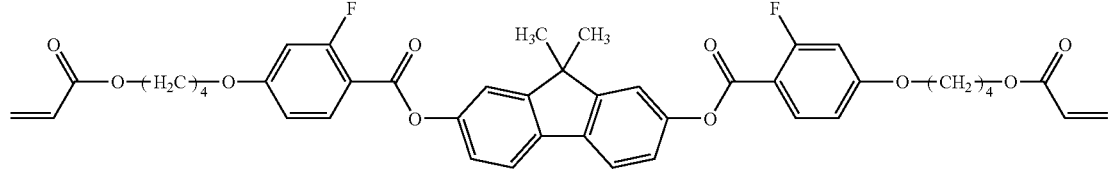
(1-10)
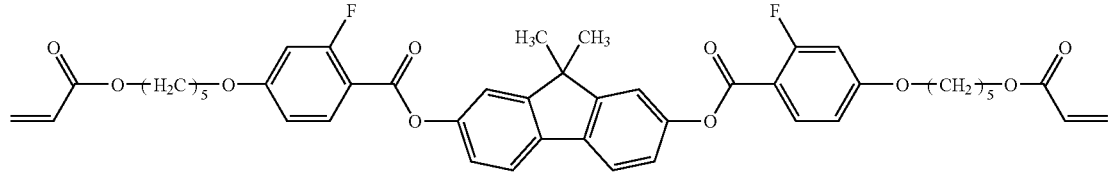
(1-11)
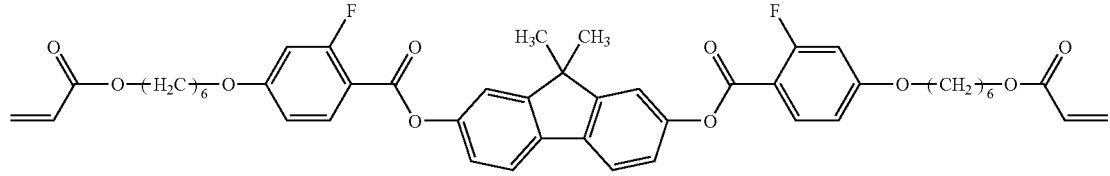
(1-12)
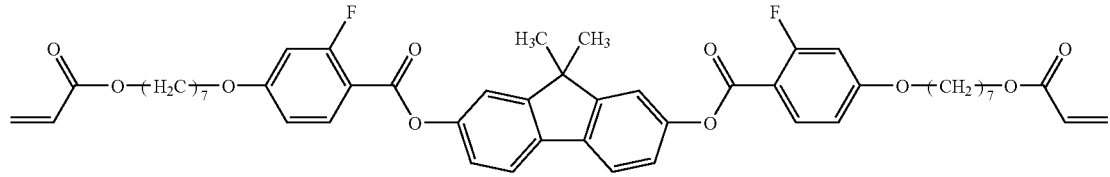
(1-13)
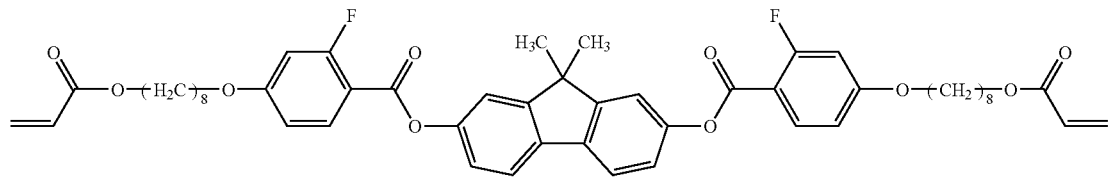
(1-14)
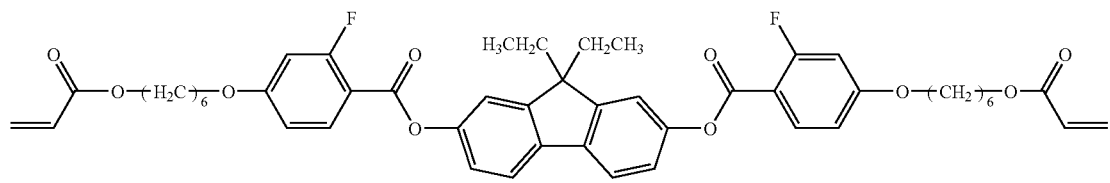
(1-15)

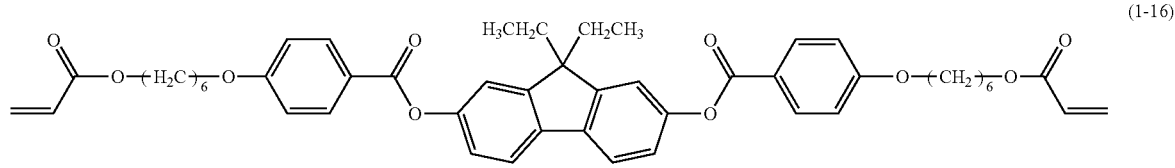

(1-16)

Preferred examples of Compound (2) include Compound (5):

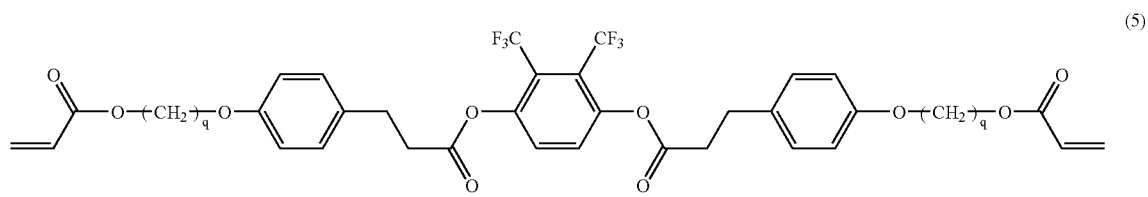

(5)

wherein q is an integer of from 2 to 10.

Compound (5) is used for stabilizing the alignment of the polymerizable liquid crystal composition. By adding Compound (5) to the polymerizable liquid crystal composition, alignment defects can be reduced. Compound (5) may be such a compound that does not exhibit a liquid crystal phase. Preferred examples of Compound (5) include the following compounds (2-1) to (2-7):

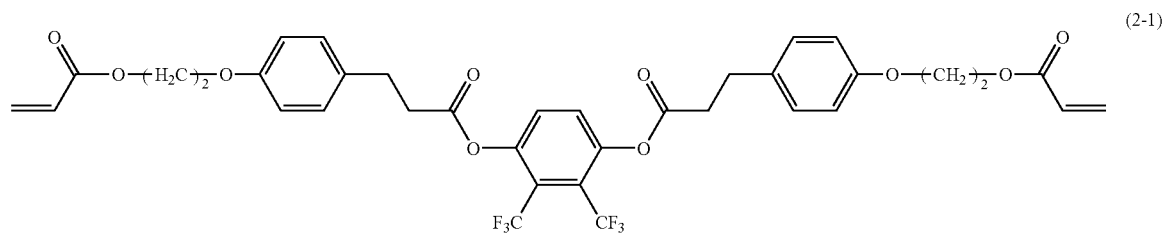

(2-1)

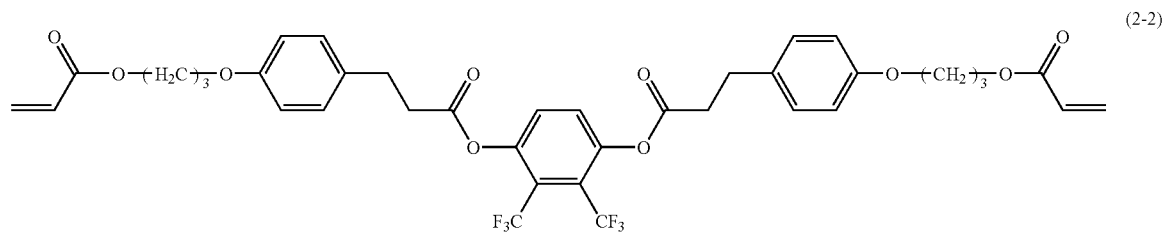

(2-2)

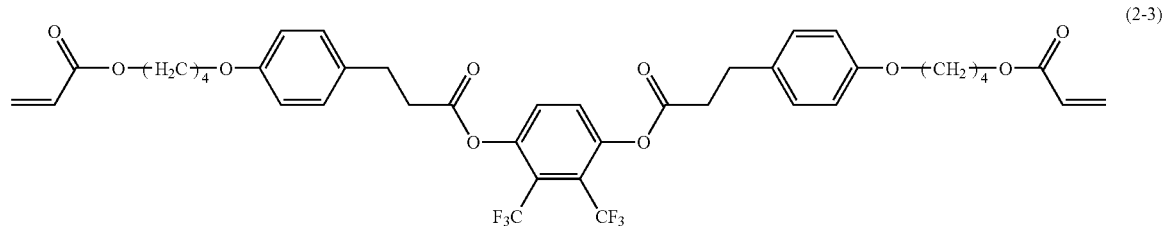

(2-3)

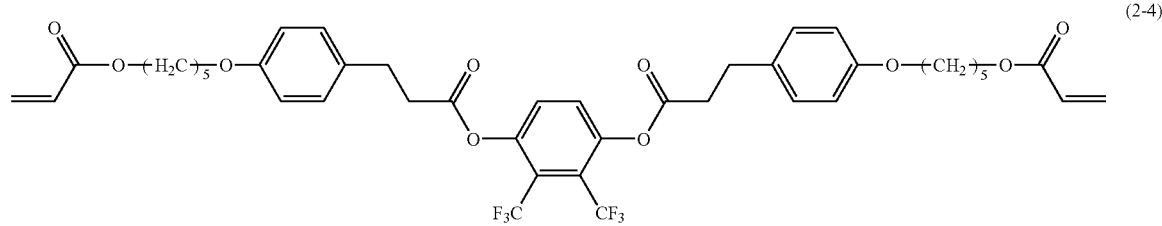

(2-4)

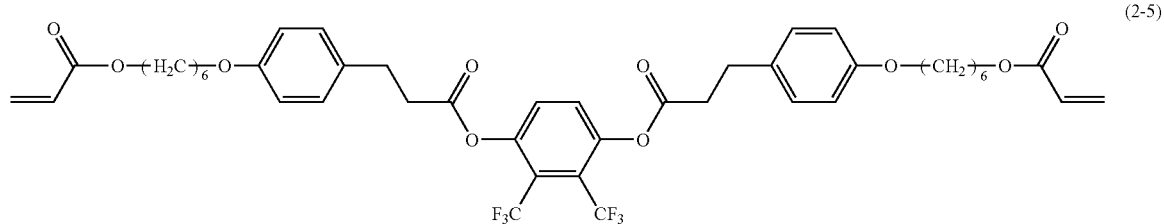
(2-5)

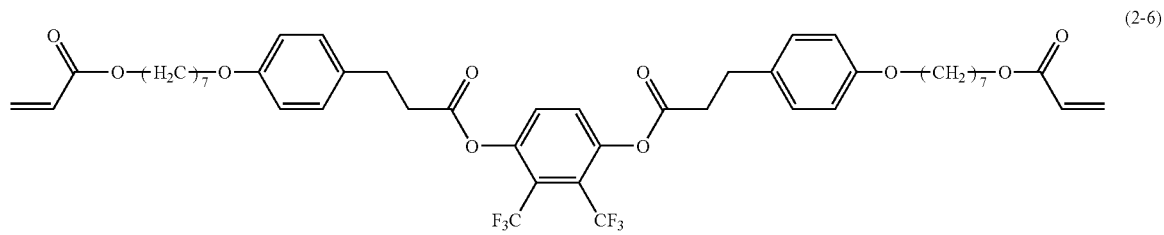
(2-6)

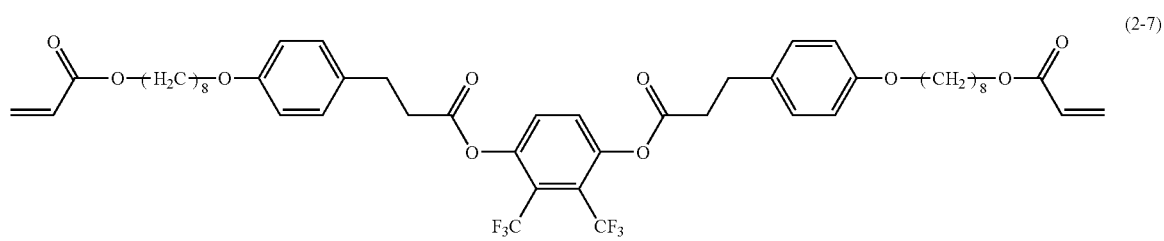
(2-7)

Preferred examples of Compound (2) include the following compounds (2-8) and (2-9) in addition to Compound (5):

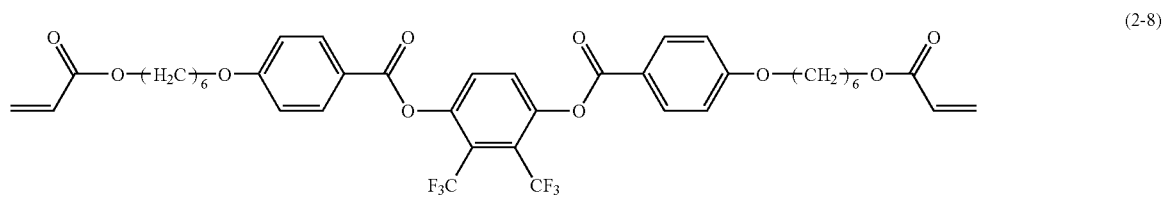
(2-8)

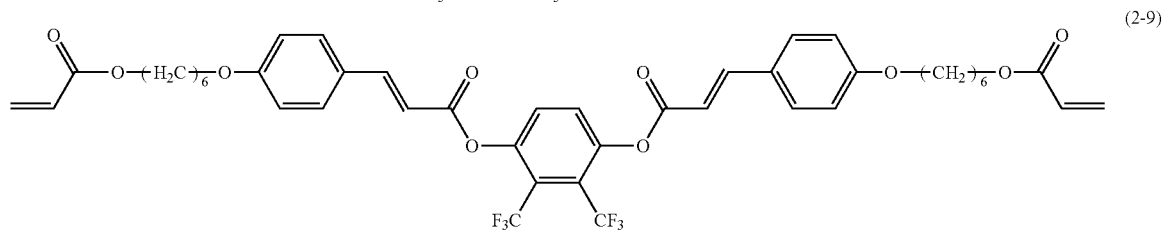
(2-9)

Preferred examples of Compound (3) include Compound (6) having a cyano group at an end thereof:

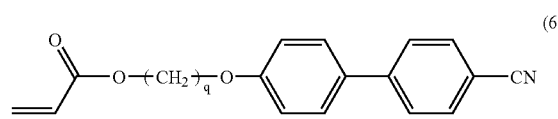
(6)

wherein q is an integer of from 2 to 10.

Compound (6) is used for controlling the melting point of the polymerizable liquid crystal composition. By adding Compound (6) to the polymerizable liquid crystal composition, the melting point of the composition can be controlled to be close to room temperature. Preferred examples of Compound (6) include the following compounds (3-1) to (3-7):

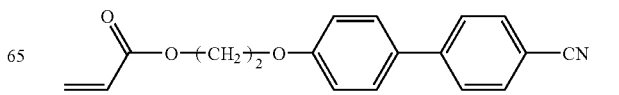
(3-1)

-continued (3-2)
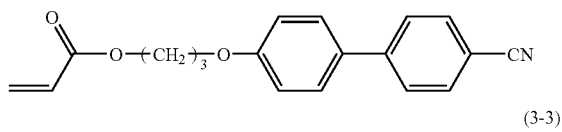

(3-3)

(3-4)

(3-5)

component is from 50 to 99% by weight, and preferably from 50 to 90% by weight, based on the total amount of Compound (1), Compound (2) and Compound (3). One or both of Compound (2) and Compound (3) are used. The proportions of the compounds each is from 0 to 50% by weight, and preferably 0 or from 10 to 50% by weight, based on the total amount of Compound (1), Compound (2) and Compound (3). In the case where both Compound (2) and Compound (3) are used, the preferred proportions of the compounds each is from 10 to 40% by weight. With respect to all the compounds (1) to (3), a sole compound or a combination of plural compounds may be used.

Preferred examples of the composition of the invention include a composition containing Compound (4) and at least one of Compound (5) and Compound (6). In this case, the proportion of Compound (4) is from 50 to 90% by weight, the proportion of Compound (5) is from 0 to 50% by weight, the proportion of Compound (6) is from 0 to 50% by weight, and the total proportion of Compound (5) and Compound (6) is from 10 to 50% by weight, based on the total amount of Compound (4), Compound (5) and Compound (6):

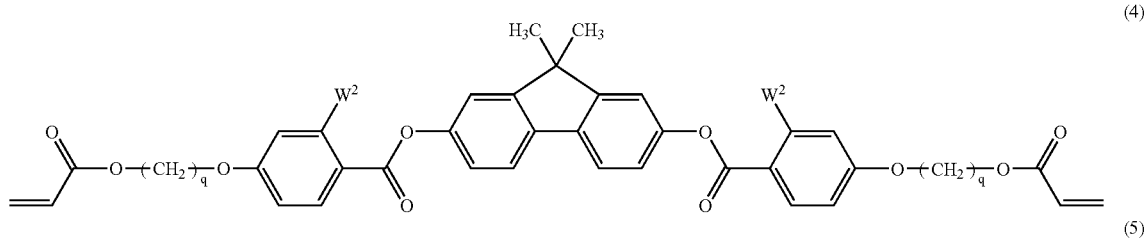

(4)

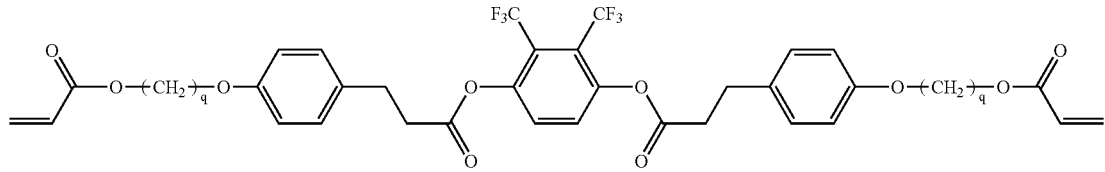

(5)

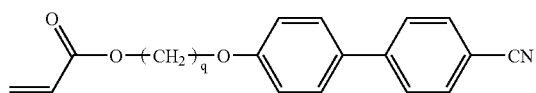

(6)

The symbols in Formulae (4) to (6) have the meanings described hereinbefore.

Preferred examples of the composition of the invention include a composition having a proportion of Compound (4) of from 50 to 80% by weight, a proportion of Compound (5) of from 10 to 40% by weight, a proportion of Compound (6) of from 10 to 40% by weight, and a total proportion of Compound (5) and Compound (6) of from 20 to 50% by weight, which is referred to a composition A in some cases in the following description. A composition using Compound (4) wherein $W^2$ is hydrogen is more preferred in this case.

Preferred examples of the composition of the invention also include a composition having a proportion of Compound (4) of from 50 to 90% by weight, a proportion of Compound (5) of from 10 to 50% by weight, and a proportion of Compound (6) of 0% by weight, which is referred a composition B in some cases in the following description.

-continued (3-6)
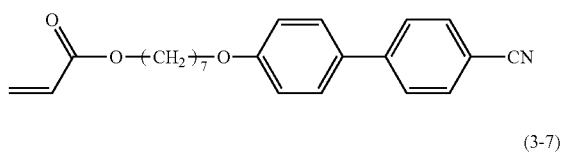

(3-7)

The proportions of the components constituting the polymerizable liquid crystal composition of the invention will be described. The proportion of Compound (1) as a major Preferred examples of the composition of the invention also include a composition having a proportion of Compound (4) of from 50 to 90% by weight, a proportion of Compound (5) of 0% by weight, and a proportion of Compound (6) of from 10 to 50% by weight, which is referred to a composition C in some cases in the following description.

The polymerizable liquid crystal composition of the invention may further contain an organic silicon compound having a primary amino group. The polymerizable liquid crystal composition has such characteristics that homeotropic alignment is liable to be exhibited. Specific examples of the organic silicon compound having a primary amino group include a compound represented by Formula (7). In the case where Compound (7) is used, the proportion thereof is preferably from 1 to 20% by weight, and more preferably from 1 to 10% by weight, based on the total amount of Compound (1), Compound (2) and Compound (3):

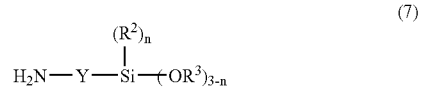
(7)

The symbols in Formula (7) have the meanings described hereinbefore.

The following compound, which is represented by Formula (7) wherein $R^3$ is ethyl, Y is trimethylene, and n is 0, is particularly preferred as the organic silicon compound:

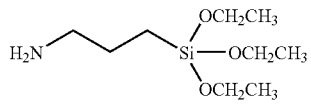

Both a composition containing Compound (1), Compound (2) and Compound (3), and a composition containing Compound (1) and Compound (2) but not containing Compound (3) form a polymerizable liquid crystal layer exhibiting homogeneous alignment by coating the composition on a polyimide alignment layer, which has been applied on a glass substrate and subjected to a rubbing treatment. Preferred examples of the compositions include the composition A and the composition B. A composition containing Compound (1) and Compound (3) but not containing Compound (2) forms a polymerizable liquid crystal layer exhibiting hybrid alignment by coating the composition in the same manner. Preferred examples of the composition include the composition C. A composition containing Compound (1), Compound (2) and Compound (3), and a composition containing Compound (1) and Compound (2) but not containing Compound (3), to which Compound (7) is added in a proportion of from 1 to 20% by weight based on the total amount of the compounds (1) to (3) and Compound (7), form a polymerizable liquid crystal layer exhibiting homeotropic alignment by coating the composition on a glass substrate. The glass substrate in this case may not have a polyimide alignment layer provided thereon. Preferred examples of the compositions include the composition A and the composition B, to which Compound (7) is added, and the proportion of Compound (7) in these compositions is from 1 to 10% by weight based on the total amount of the compounds (4) to (6) and Compound (7).

An optically anisotropic thin film obtained by polymerizing the polymerizable liquid crystal composition of the invention on a substrate has such characteristics that it is not discolored to yellow, suffers less reduction in retardation, suffers less reduction in thickness, is transparent, and is not released from the substrate, under the condition of heating to 200° C. In other words, the optically anisotropic thin film has such heat resistance that withstands vapor deposition of a transparent electrode and annealing on formation of a polyimide alignment layer. Accordingly, the optically anisotropic thin film can be favorably used in a liquid crystal display device having a liquid crystal thin film formed inside a liquid crystal cell.

The optically anisotropic thin film of the invention preferably has a thickness of from 0.01 to 10 μm, and more preferably from 0.05 to 5 μm.

The polymerizable liquid crystal composition of the invention may contain other polymerizable compounds than the aforementioned polymerizable liquid crystal compounds in such ranges that do not impair the advantages of the invention. The polymerizable compounds may not have liquid crystallinity. The preferred amount of the non-liquid crystal polymerizable compound varies depending on the structures of the polymerizable liquid crystal compounds and the compositional ratios thereof, and is generally 40% by weight or less, more preferably 30% by weight or less, and further preferably 20% by weight or less, based on the total amount of the composition. The amount is preferably 40% by weight or less for maintaining the liquid crystallinity of the composition and for preventing the liquid crystal layer from being separated. Examples of the non-liquid crystal polymerizable compound include a polyester(meth)acrylate, a polyurethane(meth)acrylate and an epoxy resin. The polyester(meth)acrylate is obtained by reacting a polyester prepolymer of a polyhydric alcohol and a monobasic acid or a polybasic acid with (meth)acrylic acid. The polyurethane (meth)acrylate is obtained by reacting a polyol with a compound having two isocyanato groups and then further reacting with (meth)acrylic acid. Examples of the epoxy resin include a bisphenol A type epoxy resin, a bisphenol F type epoxy resin, a novolac type epoxy resin, a polyglycidyl polycarboxylate ester, a polyol polyglycidyl ether, a fatty acid type epoxy resin, an alicyclic epoxy resin, an aminoepoxy resin, a triphenolmethane type epoxy resin and a dihydroxybenzene type epoxy resin. The term "(meth)acrylate" herein is a generic term for an acrylate and a methacrylate, and the term "(meth)acrylic acid" is a generic term for acrylic acid and methacrylic acid.

Preferred examples of the non-liquid crystal polymerizable compound include methyl(meth)acrylate, ethyl(meth) acrylate, butyl(meth)acrylate, 2-ethylhexyl(meth)acrylate, phenyl(meth)acrylate, vinyl chloride, vinyl fluoride, vinyl acetate, vinyl pivalate, vinyl 2,2-dimethylbutanoate, vinyl 2,2-dimethylpentanoate, vinyl 2-methyl-2-butanoate, vinyl propionate, vinyl stearate, vinyl 2-ethyl-2-methylbutanoate, N-vinylacetamide, vinyl p-t-butylbenzoate, vinyl N,N-dimethylaminobenzoate, vinyl benzoate, styrene, o-, m- or p-chloromethylstyrene, α-methylstyrene, ethyl vinyl ether, hydroxybutyl monovinyl ether, t-amyl vinyl ether, cyclohexyanedimethanolmethyl vinyl ether, tetrafluoroethene and hexafluoropropene.

In order to improve the film forming function of the polymer, a polyfunctional acrylate may be added to the composition. Preferred examples of the polyfunctional acrylate include 1,4-butanediol diacrylate, 1,6-hexanediol diacrylate, 1,9-nonanediol diacrylate, neopentyl glycol diacrylate, triethylene glycol diacrylate, tetraethylene glycol diacrylate, trimethylolpropane triacrylate, trimethylol ethylene oxide adduct triacrylate, pentaerythritol triacrylate, trisacryloxyethyl phosphate, bisphenol A ethylene oxide adduct diacrylate, bisphenol A glycidyl diacrylate and polyethylene glycol diacrylate.

In order to optimize the polymerization speed of the polymerizable liquid crystal composition, a known photopolymerization initiator may be added thereto. The preferred addition amount of the photopolymerization initiator is from 0.01 to 5% by weight, and more preferably from 0.01 to 1% by weight, based on the total amount of the composition. Examples of the photopolymerization initiator include 2-hydroxy-2-methyl-1-phenylpropan-1-one (Darocure 1173), 1-hydroxycyclohexyl phenyl ketone (Irgacure 184), 2,2-dimethoxy-1,2-diphenylethan-1-one (Irgacure 651), Irgacure 500, Irgacure 2959, Irgacure 907, Irgacure 369, Irgacure 1300, Irgacure 819, Irgacure 1700, Irgacure 1800, Irgacure 1850, Darocure 4265, Irgacure 784, p-methoxyphenyl-2,4-bis(trichloromethyl)triazine, 2-(p-butoxystyryl)-5-trichloromethyl-1,3,4-oxadiazole, 9-phenylacrridine, 1-(4-isopropylphenyl)-2-hydroxy-2-methylpropan-1-one, benzyl dimethyl ketal, 2-methyl-1-(4-methylthio)phenyl)-2-morpholinopropan-1-one and a mixture of 2,4-diethylxanthone and p-dimethylaminobenzoic acid. "Darocure" and "Irgacure" are trade names of commercial products available from Ciba Specialty Chemicals, Inc.

A polymerization inhibitor may be added to the polymerizable liquid crystal composition for preventing the composition from initiating polymerization upon storage. A known polymerization inhibitor may be used, and preferred examples thereof include 2,5-di(t-butyl)hydroxytoluene (BHT), hydroquinone, Methyl Blue, diphenylpicric acid hydrazide (DPPH), benzothiazine, 4-nitrosodimethylaniline (NIDI), o-hydroxybenzophenone and p-methoxyphenol.

In order to improve the storage stability of the polymerizable liquid crystal composition, an oxygen inhibitor may be added thereto. A radical formed in the composition provides a peroxide radical through reaction with oxygen in the atmosphere to accelerate unfavorable reaction with the polymerizable compound. It is preferred to add an oxygen inhibitor for preventing the unfavorable reaction. Examples of the oxygen inhibitor include a phosphate ester compound and an amine compound.

In the following description, the liquid crystal film of the invention obtained by polymerizing the polymerizable liquid crystal composition may be simply referred to as a liquid crystal film in some cases. The liquid crystal film can be produced, for example, in the following manner. The polymerizable liquid crystal composition is applied on a support substrate to form a coated film. The polymerizable liquid crystal composition is polymerized by irradiating the coated film with light, so as to fix the nematic alignment of the composition in the coated film in a liquid crystal state. Examples of the support substrate that can be used herein include plastic films, such as polyimide, polyamideimide, polyamide, polyetherimide, polyether ether ketone, polyether ketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, an acrylic resin, polyvinyl alcohol, polypropylene, cellulose, triacetyl cellulose and a partially saponified product thereof, an epoxy resin, a phenol resin and a norbornene resin. In the case where the polymerizable liquid crystal composition is used after dissolving in a solvent, a protective layer may be formed on the plastic film for preventing the film from being damaged by the solvent. Such a supporting substrate that is damaged by the solvent can be used in the invention by forming the protective layer. Examples of the material for the protective layer include polyvinyl alcohol. In order to improve adhesion between the protective layer and the support substrate, an anchor coating layer may be formed between them. Either an inorganic material or an organic material may be used without problem for the anchor coating layer as far as the material improve the adhesion between the protective layer and the support substrate.

The plastic film may be either a uniaxially stretched film or a biaxially stretched film. The plastic film may be subjected to a surface treatment, such as a hydrophilic treatment, e.g., a corona treatment and a plasma treatment, and a hydrophobic treatment. The plastic film may be a multilayer film. Instead of the plastic film, the support substrate may be a metallic substrate, such as aluminum, iron and copper, having slit grooves formed on the surface thereof, or a glass substrate, such as alkali glass, borosilicate glass and flint glass, having a surface etched to form slit grooves.

One of the major objects of the invention is to form an optically anisotropic thin film inside a liquid crystal cell. Therefore, the support substrate is preferably such a glass substrate that does not suffer deformation and change in optical characteristics even upon heating to a temperature of from 200 to 250° C.

In order to facilitate a coating operation or to control the alignment of the liquid crystal phase, a surfactant may be added to polymerizable liquid crystal composition in such an amount that does not impair the advantages of the invention. Examples of the surfactant include imidazoline, a quaternary ammonium salt, an alkylamine oxide, a polyamine derivative, a polyoxyethylene-polyoxypropylene condensate, polyethylene glycol and an ester thereof, sodium lauryl sulfate, ammonium lauryl sulfate, a lauryl sulfate amine compound, an alkyl-substituted aromatic sulfonate salt, an alkylphosphate salt, an aliphatic or aromatic sulfonic acid formalin condensate, laurylamide propyl betaine, lauryl aminoacetic acid betaine, a polyethylene glycol fatty acid ester, polyoxyethylene alkylamine, a perfluoroalkyl sulfonate salt, a perfluoroalkyl carboxylate salt, a perfluoroalkyl ethyleneoxide adduct, a perfluoroalkyl trmethylammonium salt, an oligomer having a perfluoroalkyl group and a hydrophilic group, an oligomer having a perfluoroalkyl group and an oleophilic group, and urethane having a perfluoroalkyl group. The addition amount of the surfactant varies depending on the kind of the surfactant and the composition of the polymerizable liquid crystal composition, and is generally from 20 ppm to 5% by weight, and preferably from 100 ppm to 1% by weight, based on the total amount of the polymerizable liquid crystal compounds in the polymerizable liquid crystal composition.

The support substrate may be subjected to a mechanical surface treatment, such as a rubbing treatment, before forming the coated film. In the case where a polymerizable liquid crystal layer having homeotropic alignment is formed, and in the case where the polymerizable liquid crystal layer is polymerized to form a liquid crystal film having homeotropic alignment, a surface treatment, such as a rubbing treatment, generally may not be carried out, a rubbing treatment may be carried out to prevent alignment defects from being formed. In the cases where a polymerizable liquid crystal layer having homogeneous alignment or hybrid alignment is formed, and where the polymerizable liquid crystal layer is polymerized to form a liquid crystal film having the alignment fixed, a rubbing treatment is generally carried out. The rubbing treatment may be applied directly to the support substrate, or in alternative, it is possible that an alignment layer is provided on the support substrate in advance, and the alignment layer is subjected to the rubbing treatment. Examples of the alignment layer include polyimide, polyamide and polyvinyl alcohol. An arbitrary method may be employed for the rubbing treatment, and in general, such a method is employed as a method where rubbing cloth formed of such a material as rayon, cotton and polyamide wound around a metallic roll is moved while rotating, and a method where the support substrate is moved with respect to the fixed roll. Depending on the kind of the support substrate, such a method may also be employed that silicon oxide is obliquely deposited on the surface thereof to apply alignment.

Upon producing the liquid crystal film, the polymerizable liquid crystal composition may be used as it is, and it is possible that the polymerizable liquid crystal composition dissolved in a solvent is applied, and then the solvent is removed to form a thin film. Preferred examples of the solvent include benzene, toluene, heptane, xylene, mesitylene, n-butylbenzene, diethylbenzene, tetralin, methoxybenzene, 1,2-dimethoxybenzene, ethylene glycol dimethyl ether, diethylene glycol dimethyl ether, acetone, methyl ethyl ketone, methyl isobutyl ketone, cyclohexanone, cyclopentanone, ethyl acetate, methyl lactate, ethyl lactate, ethylene glycol monomethyl ether acetate, propylene glycol monomethyl ether acetate, propylene glycol monoethyl ether acetate, γ-butyrolactone, 2-pyrrolidone, N-methyl-2-pyrrolidone, dimethylsulfoxide, N,N-dimethylacetamide, N,N-dimethylaectamide dimethyl acetal, dimethylformamide, chloroform, dichloromethane, carbon tetrachloride, dichloroethane, trichloroethane, tetrachloroethylene, chlorobenzene, tetrahydrofuran (THF), chloroform, 1,4-dioxane, bis(methoxyethyl) ether, tetramethylurea, trifluoroacetic acid, ethyl trifluoroacetate, hexafluoro-2-propanol, t-butyl alcohol, diacetone alcohol, ethanol, 2-propanol (isopropyl alcohol), glycerin, monoacetin, ethylene glycol, triethylene glycol, hexylene glycol, ethylene glycol monomethyl ether, ethyl cellosolve and butyl cellosolve. These solvents may be used solely or as a mixed solvent of plural kinds of them.

Examples of the method for obtaining a uniform thickness include a micro-gravure coating method, a gravure coating method, a wire bar coating method, a dip coating method, a spray coating method and a meniscus coating method. In particular, a wire bar coating method or the like, in which a shearing force is applied to the liquid crystal composition upon coating, may be used in the case where the alignment of the liquid crystal composition is controlled without a surface treatment of the substrate, such as a rubbing treatment.

A solvent may be used for uniformly dispersing an organic silicon compound in the polymerizable liquid crystal composition. The solvent may be selected depending on purposes as far as the solvent has a function of dissolving the organic silicon compound and Compounds (1) to (3), together. Preferred examples of the solvent include an ether, such as THF, a ketone, such as acetone and methyl ethyl ketone, an alcohol, such as ethyl alcohol, isopropyl alcohol, n-propyl alcohol and methoxymethyl alcohol, an acetate ester, such as ethyl acetate and methyl acetate, chloroform, and acetonitrile.

In the case where a solvent is used, the solvent is removed after coating to form a coated layer of the polymerizable liquid crystal composition having a uniform thickness on the support substrate. The conditions for removing the solvent are not particularly limited, and the coated layer may be dried until the solvent is substantially removed, whereby the coated layer loses flowability. The solvent may be removed in such a manner as air drying at room temperature, drying on a hot plate, drying in a drying furnace, and blowing of warm air or hot air. There are some cases where nematic alignment of the polymerizable liquid crystal composition in the coated film is completed during the drying operation of the coated film, depending on the kinds of the compounds used in the polymerizable liquid crystal composition and the compositional ratios thereof. Therefore, the coated film having been subjected to the drying step may be subjected to a polymerization step without a heat treating step described later. However, in order to uniformize the alignment of the liquid crystal molecules in the coated film, it is preferred that the coated film having been subjected to the drying step is subjected to a heat treatment, and then applied to a photopolymerization step.

The preferred ranges of the temperature and the time for subjecting the coated film to the heat treatment, the wavelength of light used for light irradiation, and the amount of light irradiated from a light source vary depending on the kinds and the compositional ratios of the compounds used in the polymerizable liquid crystal composition, and the presence or absence and the addition amount of the photopolymerization initiator. Therefore, conditions including the temperature and the time for subjecting the coated film to the heat treatment, the wavelength of light used for light irradiation, and the amount of light irradiated from a light source shown below are only rough standard ranges.

The heat treatment of the coated film is carried out at a temperature higher than the liquid crystal phase transition temperature of the polymerizable liquid crystal composition. One example of the method of heat treatment is such a method that the coated film is heated to a temperature, at which the polymerizable liquid crystal composition exhibits a nematic liquid crystal phase, to make the polymerizable liquid crystal composition in the coated film exhibit nematic alignment. Nematic alignment may also be formed by changing the temperature of the coated film within a temperature range where the polymerizable liquid crystal composition exhibits a nematic liquid crystal phase. In this method, the coated film is heated to a high temperature region within the temperature range to form roughly nematic alignment in the coated film, and the temperature is decreased to form well ordered alignment. In the case where any of the methods is employed, the heat treating temperature is from room temperature to 120° C., preferably from room temperature to 80° C., and more preferably from room temperature to 70° C., and the heat treating time is from 5 seconds to 2 hours, preferably from 10 seconds to 40 minutes, and more preferably from 20 seconds to 20 minutes. The heat treating time is preferably 5 seconds or more for increasing the temperature of the layer constituted by the polymerizable liquid crystal composition to the prescribed temperature. The heat treating time is preferably 2 hours or less for preventing the productivity from being deteriorated.

The nematic alignment state of the polymerizable liquid crystal composition in the coated film is fixed through polymerization of the coated film by irradiating with light or an electron beam. The wavelength of light used for light irradiation is not particularly limited, and an ultraviolet ray, a visible ray and an infrared ray (heat ray) may be used.

In general, an ultraviolet ray or a visible ray may be used, the wavelength of which is from 150 to 500 nm, preferably from 250 to 450 nm, and more preferably from 300 to 400 nm. Examples of the light source include a low pressure mercury lamp (such as a bactericidal lamp, a fluorescent chemical lamp and a black lamp), a high pressure discharge lamp (such as a high pressure mercury lamp and a metal halide lamp), and a short arc discharge lamp (such as an ultrahigh pressure mercury lamp, a xenon lamp and a mercury xenon lamp). Preferred examples of the light source include a metal halide lamp, a xenon lamp and a high pressure mercury lamp. The wavelength range of the irradiation light source may be selected by providing a filter transmitting a specific wavelength range between the light source and the coated film of the polymerizable liquid crystal composition. The amount of light irradiated from the light source is from 2 to 5,000 mJ/cm$^2$, preferably from 10 to 3,000 mJ/cm2, and more preferably from 100 to 2,000 mJ/cm$^2$. The temperature condition upon irradiating light is preferably the same as that in the heat treatment.

A liquid crystal display device having a liquid crystal thin film having optical anisotropy, which is obtained by polymerizing the polymerizable liquid crystal composition, inside a liquid crystal cell will be described.

The liquid crystal cell has two plane substrates disposed in parallel to each other, at least one of which is transparent. A transparent electrode and an alignment layer are formed on at least one of the substrates, and a transparent electrode and an alignment layer may be formed on the other substrate depending on necessity. A liquid crystal medium is held between the two substrates facing each other. The liquid crystal medium exhibits at least two different alignment states depending on the alignment layer and the voltage applied to the facing electrodes. The aforementioned constitution is the minimum constitution of the liquid crystal cell. The liquid crystal cell is provided, depending on necessity, with an active element, which is represented by a TFT, for controlling the applied voltage by every pixels, and a color filter, and an overcoating layer is provided thereon for flattening depending on necessity. The liquid crystal cell is provided, depending on necessity, with a light source referred to as a backlight and at least one polarizing plate. The polarizing plate is disposed between the liquid crystal medium and the light source, and the liquid crystal thin film, which is obtained by aligning and polymerizing the polymerizable liquid crystal composition, is disposed between the liquid crystal medium and the polarizing plate on the flat substrate.

Figure 2:
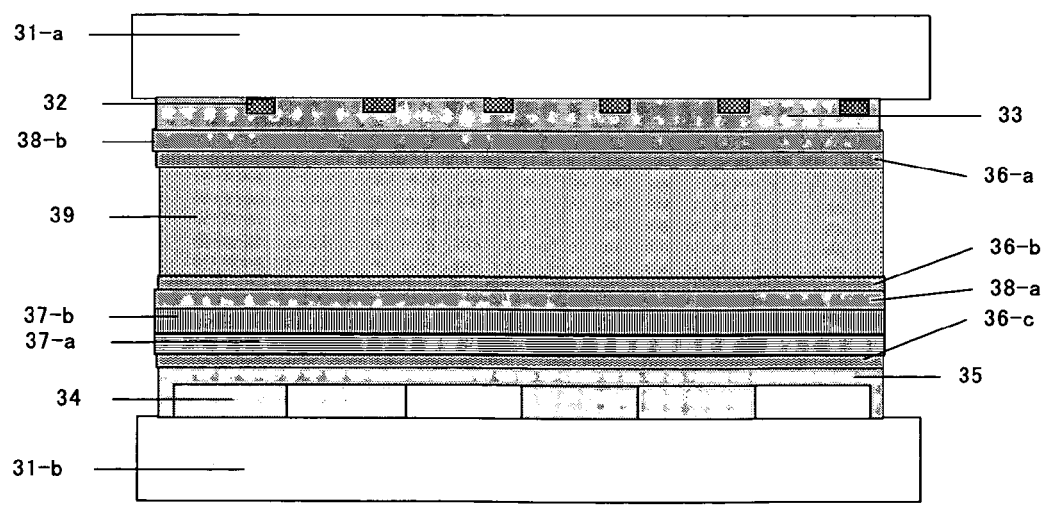
FIG. 2 is a diagram showing a constitution of example 2 of a liquid crystal cell (a liquid crystal cell having two optically anisotropic liquid crystal thin films having different alignment states accumulated inside the liquid crystal cell).
Figure 3:
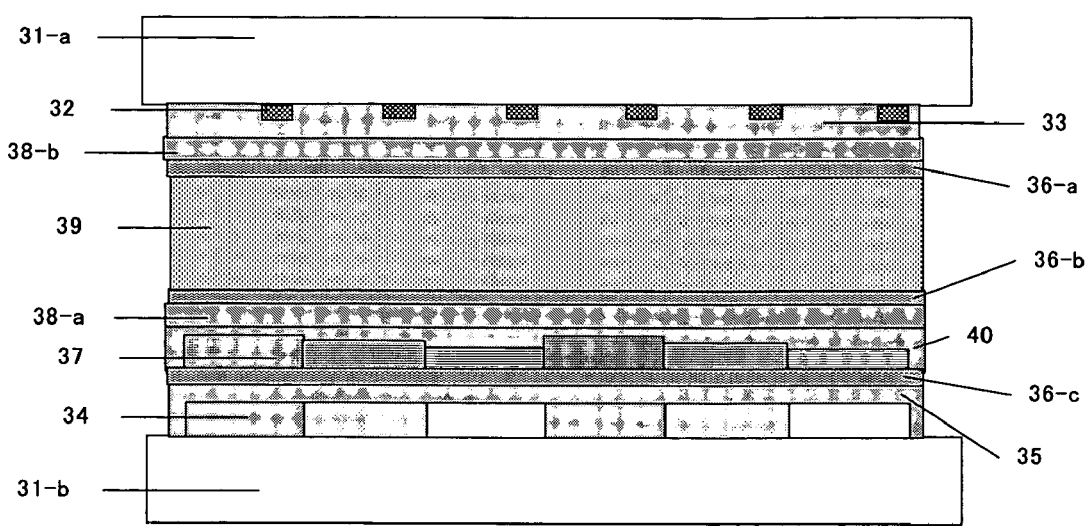
FIG. 3 is a diagram showing a constitution of example 3 of a liquid crystal cell (a liquid crystal cell having optically anisotropic liquid crystal thin films obtained by polymerizing plural polymerizable liquid crystal compositions adjusted in retardation formed by coating them separately on individual pixel.

Specific examples of the constitution of the liquid crystal cell are shown in FIGS. 1 to 3, but the invention is not limited thereto.

Two or more kinds of the liquid crystal thin films, which are different in liquid crystal skeleton, alignment or retardation, may be accumulated directly on each other or through a substrate, an adhesive layer or a coating layer, such as a polymer, to form a multilayer film, and may be formed independently on two or more regions.

One of the advantages obtained by forming the liquid crystal thin film having optical anisotropy inside the liquid crystal cell by using the polymerizable liquid crystal composition capable of fixing the nematic alignment state through irradiation with light resides in that the liquid crystal thin film having particular optical anisotropy can be formed independently on every pixels of the liquid crystal panel or every regions inside a pixel of the liquid crystal panel, but the invention is not limited thereto.

Figure 4:
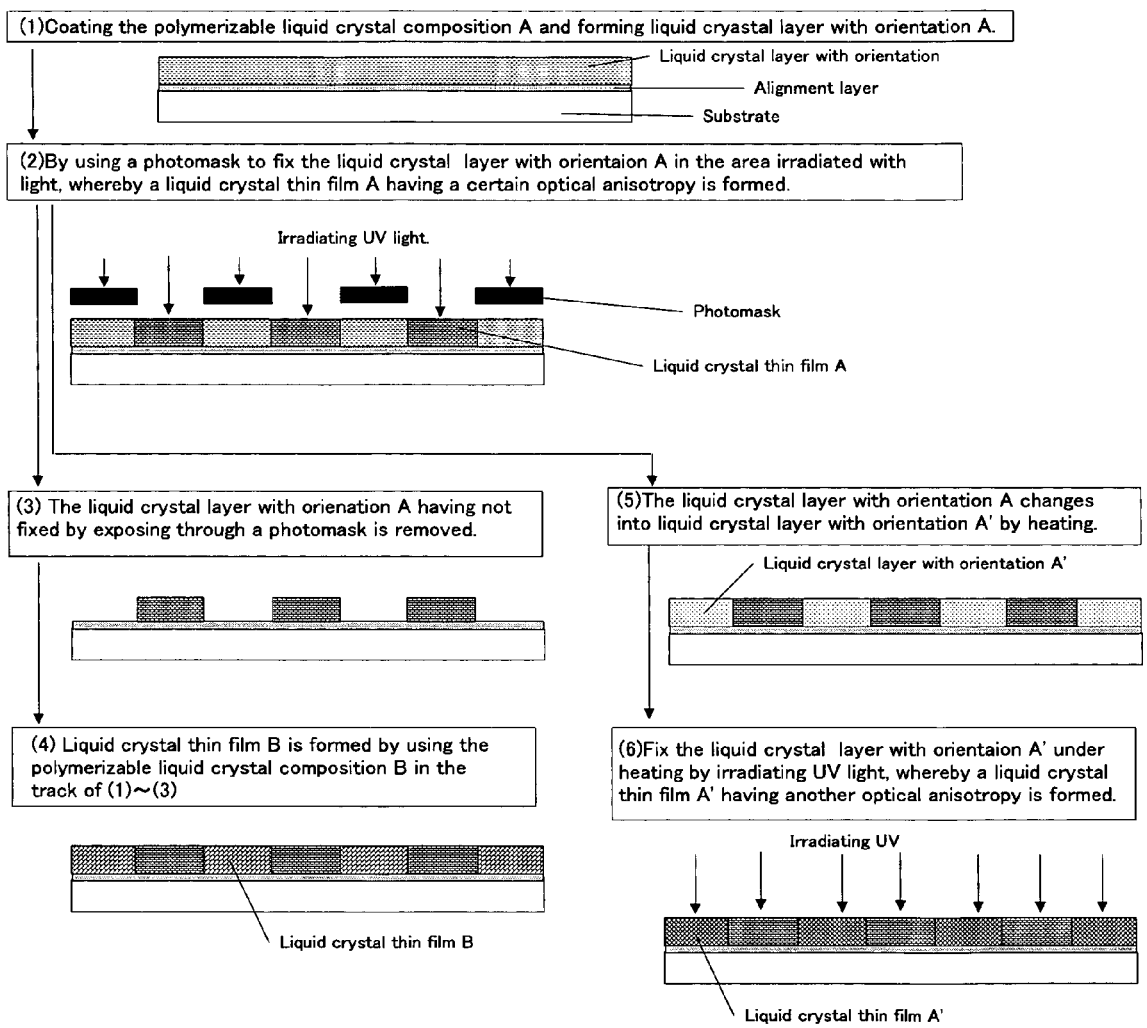
FIG. 4 is a schematic diagram showing a process as an example of a method for forming a liquid crystal thin film having particular optical anisotropy on a prescribed area of a substrate.

As shown in FIG. 4(1), the polymerizable liquid crystal composition is applied on a substrate as described in the aforementioned method to form a liquid crystal alignment A having optical anisotropy. It is then irradiated with light (exposed) under the condition by using a photomask to fix the liquid crystal alignment in an area irradiated with light, whereby a liquid crystal thin film A having certain optical anisotropy is formed. In an area that has not been irradiated with light, the liquid crystal alignment is not fixed (as shown in FIG. 4(2)).

The liquid crystal composition in an area which is not irradiated through a photomask and then not fixed to an alignment, can be removed by dissolving with a developer solution (as shown in FIG. 4(3)). A liquid crystal thin film B having optical anisotropy different from that of the liquid crystal thin film A can be formed in that area (as shown in FIG. 4(4)).

The polymerizable liquid crystal material of the invention has thermotropic nature where the optical anisotropy varies depending on temperature, and the following procedures can be applied thereto by utilizing the nature. The area that has been shielded with the photomask as shown in FIG. 4(2) and has not been exposed to prevent the liquid crystal alignment from being fixed is heated, whereby the area exhibits such optical anisotropy that is different from that of the initial liquid crystal alignment (as shown in FIG. 4(5)). For example, when the area is heated to a temperature higher than the isotropic phase transition point, the optical anisotropy becomes zero. Accordingly, the liquid crystal alignment is exposed under heating to a certain temperature, whereby a liquid crystal thin film A' having optical anisotropy different from that of the liquid crystal thin film A can be formed (as shown in FIG. 4(6)).

In the case where a liquid crystal thin film is formed independently on a prescribed area of a liquid crystal panel, the pattern is demanded to have an accuracy of less than 10 μm. In order to obtain stable pattern accuracy, it is effective to add the polymerization inhibitor described above or an ultraviolet ray absorbent in advance. Examples of the ultraviolet ray absorbent include 2-(3-t-butyl-5-methyl-2-hydroxyphenyl)-5-chlorobenzotriazole, alkoxybenzophenone, and Tinuvin PS, Tinuvin 213, Tinuvin 109, Tinuvin 328, Tinuvin 384-2 and Tinuvin 327, all produced by Ciba Specialty Chemicals, Inc.

EXAMPLES

The invention will be described in more detail with reference to the following examples, but the invention is not construed as being limited thereto. The polymerization conditions and the evaluation methods used in the examples were as follows.

(1) Polymerization Conditions

A specimen was irradiated with light having an intensity of 30 mW/cm$^2$ (365 nm) by using a 250 W ultrahigh pressure mercury lamp at room temperature in a nitrogen atmosphere.

(2) Confirmation of Liquid Crystal Alignment State

A liquid crystal film was placed on a rotatable/tiltable stage disposed between a rotatable polarizer and an analyzer, and the retardation was measured by tilting from the direction perpendicular to the film surface.

(3) Glass Substrate with Alignment Layer Subjected to Rubbing Treatment

An alignment material solution containing polyimide as a major component was applied on a glass substrate having a thickness of 0.7 mm by a spin-coating method, and after removing the solvent, the film was baked at 230° C. for 1 hour and then subjected to a rubbing treatment.

(4) Film Thickness

The liquid crystal film on a glass substrate was partially scraped away, and the step thus formed was measured with a stylus surface profile measuring device as the thickness of the film.

(5) Heating Test

The liquid crystal film formed on a glass substrate obtained by aligning and curing through UV polymerization the polymerizable liquid crystal composition on a glass substrate having an alignment layer subjected to a rubbing treatment was measured for retardation, thickness and spectral transmittance as initial values. The liquid crystal film on a glass substrate was then placed in a hot air circulation fixed temperature drying chamber having a temperature inside the chamber of 200° C., and after lapsing 1 hour, the film was taken out from the chamber and cooled to room temperature. The film was again measured for retardation, thickness and spectral transmittance. The film was again placed in the drying chamber and was measured for retardation, thickness and spectral transmittance in the same manner after lapsing 2 hours (3 hours in total) and further lapsing 5 hours (8 hours in total).

(6) Optical Anisotropy Δn

The liquid crystal film having homogeneous alignment was measured for retardation and thickness, and the optical anisotropy was calculated as retardation/thickness.

(7) Structure of Compound

The structure of the compound was identified by measuring the compound by 500 MHz proton NMR.

(8) Melting Point and Phase Transition Point of Compound

A specimen was placed on a hot plate of a melting point measuring device and observed with a polarizing microscope while increasing the temperature at 1° C. per minute. The following abbreviations are used to illustrate the liquid crystal phase behaviour of the compounds: C denotes crysatal; N denotes nematic; and I denotes Isotropic.

Synthesis Example 1

Synthesis of Compound (1-12)

First Step

Under a nitrogen atmosphere, fluorenone (100 g) and methyl iodide (212 g) were dissolved in dimethylsulfoxide (400 mL). A 50% sodium hydroxide aqueous solution (200 g) and benzyltrietnylammonium chloride (6.80 g) were added thereto, and thus the mixture was vigorously refluxed. After agitating for 1 hour, the reaction solution was put in water, and the deposited matter was filtered off. The resulting residue was recrystallized from heptane to obtain 9,9-dimethylfluorenone (73.9 g). (Melting point: 91 to 93° C.)

Second Step

Under a nitrogen atmosphere, 9,9-dimethylfluorenone (68.4 g) was dissolved in dichloromethane (600 mL), and aluminum chloride (188 g) was added thereto under cooling with an ice bath. A solution obtained by dissolving acetyl chloride (55.0 g) in dichloromethane (250 mL) was added dropwise thereto, and after agitating for 30 minutes, the ice bath was removed, and the solution was agitated at room temperature for 3 hours. The reaction solution was poured into hydrochloric acid, and the dichloromethane layer was washed with a saturated sodium hydrogencarbonate aqueous solution and water, followed by drying over anhydrous magnesium sulfate. The solvent was distilled off under reduced pressure, and the resulting residue was recrystallized from an acetone/ethanol mixed solvent to obtain 2,7-diacetyl-9, 9-dimethylfluorenone (81.9 g). (Melting point: 182 to 184° C.)

Third Step

Under a nitrogen atmosphere, 2,7-diacetyl-9,9-dimethylfluorenone (23.0 g), acetic anhydride (33.2 g) and formic acid (74.0 g) were added to dichloromethane (300 mL), and sulfuric acid was added dropwise thereto under cooling with ice. While maintaining at 10° C. or less, a 34.5% hydrogen peroxide aqueous solution (35.0 g) added dropwise thereto. After agitating at room temperature for 30 minutes, the solution was refluxed under heating for 5 hours. Water was added to the reaction solution, and after separating the mixture, the organic layer was washed with a saturated sodium hydrogencarbonate aqueous solution, a 10% sodium hydrogensulfite aqueous solution and water. The organic layer was dried over anhydrous magnesium sulfate, and the solvent was distilled off under reduced pressure. The resulting residue was purified by column chromatography (developing solvent: toluene) and recrystallized from ethanol to obtain 2,7-diacetoxy-9,9,-dimethylfluorenone (12.2 g).

Fourth Step

Under a nitrogen atmosphere, 2,7-diacetoxy-9,9,-dimethylfluorenone (5.00 g) and lithium hydroxide monohydrate (2.00 g) were dissolved in ethylene glycol (50 mL), and the solution was refluxed under heating for 2 hours. The reaction solution was poured into hydrochloric acid, and after extracting with ethyl acetate, the organic layer was washed with water and dried over anhydrous magnesium sulfate. The solvent was distilled off under reduced pressure, and the resulting residue was recrystallized from a chloroform/ethyl acetate mixed solvent to obtain 2,7-dihydroxy-9,9,-dimethylfluorenone (2.77 g). (Melting point: 177 to 180° C.)

Fifth Step

Under a nitrogen atmosphere, pyridine (934 g) was added to 6-chlorohexanol (800 g). Acetic anhydride (1,200 mL) was added thereto, and after refluxing under heating for 3 hours, the reaction solution was poured into water and extracted with toluene. The organic layer was neutralized with a saturated sodium hydrogencarbonate aqueous solution, and after washing with water, dried over anhydrous magnesium sulfate. The solvent was distilled off under reduced pressure, and the concentrated product was purified by distillation under reduced pressure to obtain 6-acetoxycyclohexane (983 g).

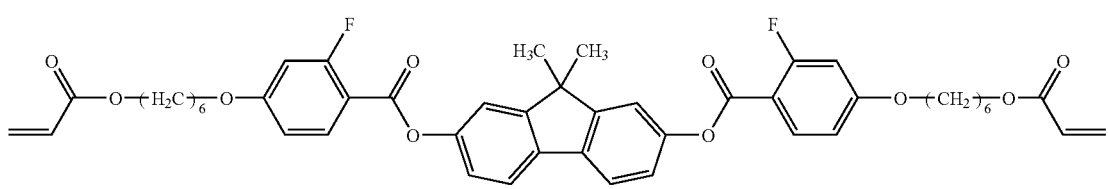

(1-12)

Sixth Step

Under a nitrogen atmosphere, 2-fluoro-4-hydroxybenzoic acid (268 g) was dissolved in N,N-dimethylformamide (3,600 mL), and sodium hydroxide (70.0 g) was added thereto, followed by agitating at 40° C. for 30 minutes. 6-Acetoxycyclohexane (312 g) was added thereto, followed by agitating at 80° C. for 5 hours. The reaction solution was poured into water and extracted with toluene. After separating the mixture, the toluene layer was washed with a sodium hydroxide aqueous solution and water, and dried over anhydrous magnesium sulfate. The solvent was distilled off under reduced pressure to obtain 268 g of a concentrated product. The concentrated product was dissolved in ethanol (500 mL), and a solution obtained by dissolving sodium hydroxide (98 g) in water (800 mL) was added thereto. After refluxing under heating for 2 hours, ethanol was distilled off, and the concentrated product was poured into hydrochloric acid. The deposited matter was filtered off and recrystallized from ethanol to obtain 4-(6-hydroxyhexyloxy)-2-fluorobenzoic acid (189 g). (Melting point: 98 to 99° C.)

Under a nitrogen atmosphere, 4-(6-hydroxyhexyloxy)-2-fluorobenzoic acid (189 g), N,N-dimethylaniline (133 g) and 2,6-dibutyl-p-cresol (0.80 g) were added to tetrahydrofuran (500 mL). Acrylic acid chloride (100 g) was added dropwise thereto, followed by agitating at 60° C. for 3 hours. The reaction solution was poured into water and extracted with ethyl acetate. The organic layer was washed with hydrochloric acid, a saturated sodium hydrogencarbonate aqueous solution and water, and after drying over anhydrous magnesium sulfate, the solvent was distilled off under reduced pressure. The resulting residue was recrystallized from ethanol to obtain 4-(6-acryloylhexyloxyhexyloxy)-2-fluorobenzoic acid (141 g).

Under a nitrogen atmosphere, 4-(6-acryloylhexyloxyhexyloxy)-2-fluorobenzoic acid (16.8 g), 2,7-dihydroxy-9,9-dimethylfluorenone (5.56 g) and 4-dimethylaminopyridine (0.15 g) were added to dichloromethane (200 mL), and a solution obtained by dissolving N,N'-dicyclohexylcarbodiimide (11.1 g) in dichloromethane (20 mL) was added dropwise thereto under cooling with ice, followed by agitating at room temperature for 12 hours. After filtering urea off, water was added to the filtrate, and the mixture was washed with hydrochloric acid, a sodium hydroxide aqueous solution and water. The organic layer was dried over anhydrous magnesium sulfate, and the solvent was distilled off under reduced pressure. The resulting residue was fractionated by column chromatography (developing solvent: toluene/ethyl acetate mixed solvent (19/1)) and recrystallized from a toluene/ethanol mixed solvent to obtain a compound (1-12) (12.6 g).

Phase transition temperature: C 95 N 100 I (° C.)

$^1$H-NMR (CDCl$_3$; δ ppm): 8.08 (t, 2H), 7.72 (d, 2H), 7.29 (d, 2H), 7.19 (d, 2H), 6.79 (dd, 2H), 6.70 (dd, 2H), 6.41 (dd, 2H), 6.13 (dd, 2H), 5.83 (dd, 2H), 4.19 (t, 4H), 4.04 (t, 4H), 1.82-1.88 (m, 4H), 1.71-1.76 (m, 4H), 1.51 (s, 6H), 1.44-1.57 (m, 8H)

Synthesis Example 2

Synthesis of Compound (1-5)

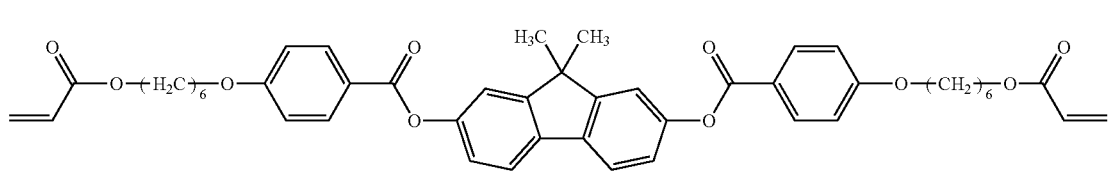

(1-5)

4-(6-Acryloyloxyhexyloxy)benzoic acid was synthesized by the method disclosed in *Liquid Crystals*, vol. 30, No. 8, pp. 979-984 (August 2003). Under a nitrogen atmosphere, 4-(6-acryloyloxyhexyloxy)benzoic acid (12.0 g), 2,7-dihydroxy-9,9-dimethylfluorenone (4.21 g) and 4-dimethylaminopyridine (0.11 g) were added to dichloromethane (200 mL), and a solution obtained by dissolving N,N'-dicyclohexylcarbodiimide (8.25 g) in dichloromethane (20 mL) was added dropwise thereto under cooling with ice, followed by agitating at room temperature for 12 hours. After filtering urea off, water was added to the filtrate, and the mixture was washed with hydrochloric acid, a sodium hydroxide aqueous solution and water. The organic layer was dried over anhydrous magnesium sulfate, and the solvent was distilled off under reduced pressure. The resulting residue was fractionated by column chromatography (developing solvent: toluene/ethyl acetate mixed solvent (19/1)) and recrystallized from a toluene/ethanol mixed solvent to obtain a compound (1-5) (9.41 g).

Phase transition temperature: C 113 N (° C.)

(A transition temperature to an isotropic phase could not be confirmed due to polymerization.)

$^1$H-NMR (CDCl$_3$; δ ppm): 8.17 (d, 4H), 7.72 (d, 2H), 7.28 (d, 2H), 7.18 (dd, 2H), 6.98 (d, 4H), 6.41 (dd, 2H), 6.13 (dd, 2H), 5.82 (dd, 2H), 4.19 (t, 4H), 4.06 (t, 4H), 1.83-1.88 (m, 4H), 1.71-1.77 (m, 4H), 1.51 (s, 6H), 1.45-1.58 (m, 8H)

Synthesis Example 3

Synthesis of Compound (2-5)

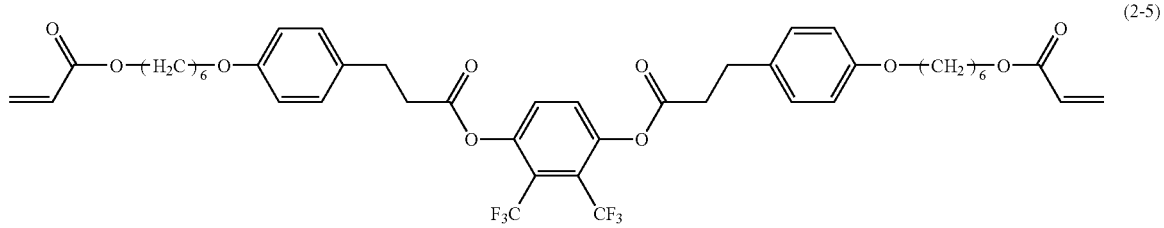

(2-5)

First Step

Under agitating a solution obtained by dissolving 3-(4-hydroxyphenyl)propionic acid (1,150 g) in ethanol (1.500 mL), sulfuric acid (230 g) was added dropwise thereto over 10 minutes, followed by refluxing for 5 hours. The reaction solution was concentrated, and the resulting concentrated solution was poured into water (1,000 mL), to which ethyl acetate was added, followed by agitating. After separating the mixture, the ethyl acetate layer was neutralized with a saturated sodium carbonate aqueous solution, washed with a small amount of water, and then dried over anhydrous magnesium sulfate. Ethyl acetate and unreacted components were distilled off from the ethyl acetate layer to obtain 1,400 g of a concentrated product. The concentrated product was purified by distillation under reduced pressure to obtain 1.144 g of ethyl 3-(4-hydroxyphenyl)propionate, which had a boiling point of 160° C. at 4.0 hPa.

Second Step 3-(4-Hydroxyphenyl)propionate (400 g) was dissolved in dimethylformamide (2,800 mL). Sodium hydroxide (98 g) was added thereto, and the mixture was agitated at 40° C. for 30 minutes. Formation of a salt was visually observed. 6-Acetoxycyclohexane (515 g) was added thereto, followed by agitating at 80° C. for 7 hours. The reaction solution was poured into water (2,000 mL), to which toluene was added, followed by agitating. After separating the mixture, the toluene layer was washed with 6N hydrochloric acid, a saturated sodium carbonate aqueous solution and water in this order, and then dried over anhydrous magnesium sulfate. The solvent was distilled off from the toluene layer to obtain 709 g of a concentrated product. Ethanol (600 mL) and 709 g of the concentrated product were added to a solution obtained by dissolving sodium hydroxide (185 g) in water (400 mL), and the mixture was refluxed for 2 hours. The reaction solution was concentrated under reduced pressure by using an evaporator, and the resulting concentrated product was poured into 6N hydrochloric acid. The resulting slurry was filtered to obtain a solid product, which was then recrystallized from ethanol to obtain 281 g of (4-(6-hydroxyhexyloxy)phenyl)propionic acid. (Melting point: 109 to 112° C.)

Third Step (4-(6-Hydroxyhexyloxy)phenyl)propionic acid (200 g), N,N-dimethylaniline (100 g) and BHT (0.3 g) were dissolved in dioxane (1,000 mL). Acrylic acid chloride (74.3 g) was added dropwise thereto over 10 minutes, followed by agitating at 60° C. for 5 hours. The reaction solution was poured into water, to which ethyl acetate was added, followed by agitating. The ethyl acetate layer was separated, washed with water, and then dried over anhydrous magnesium sulfate. The solvent was distilled off from the ethyl acetate layer to obtain a solid product. The solid product was dissolved in toluene and reprecipitated by pouring into a large amount of heptane to obtain 213 g of (4-(6-acryloyloxyhexyloxy)phenyl)propionic acid. (Melting point: 64 to 68° C.)

Fourth Step (4-(6-Acryloyloxyhexyloxy)phenyl)propionic acid (150 g), 2,3-bis(trifluoromethyl)hydroquinone(52.2 g), BHT (0.75 g) and dimethylaminopyridine (15 g) were dissolved in methylene chloride (900 mL). A solution obtained by dissolving DCC (N,N'-dicyclohexylcarbodiimide) (100 g) in methylene chloride (300 mL) was added dropwise thereto over 1 hour. After agitating for 2 hours, water was added thereto, and the mixture was separated. The methylene chloride layer was washed with 6N hydrochloric acid and a 10% sodium hydroxide aqueous solution, and dried over anhydrous magnesium sulfate. A concentrated product obtained from the methylene chloride layer was purified by column chromatography to obtain 125 g of Compound (2-5).

$^1$H-NMR (CDCl$_3$; δ ppm): 1.45-1.55 (m, 8H), 1.71-1.77 (m, 4H), 1.79-1.85 (m, 4H), 2.92 (t, 4H, J=7.5 Hz), 3.03 (t, 4H, J=7.5 Hz), 3.97 (t, 4H, J=6.5 H$_2$), 4.20 (t, 4H, J=6.5 H$_2$), 5.84 (dd, 2H, J=10 H$_2$, Hz and 1.3 Hz), 6.15 (dd, 2H, J=17 Hz and 10 Hz), 6.42 (dd, 2H, J=17 Hz and 1.3 Hz), 6.87 (d, 4H, J=8.5 Hz), 7.18 (d, 4H, J=8.5 Hz), 7.24 (s, 2H)

Synthesis Example 4

Synthesis of Compound (3-5)

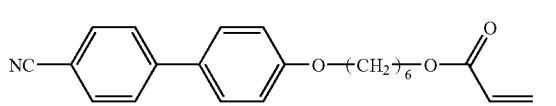

(3-5)

Compound (3-5) is synthesized by the method disclosed in *Macromolecules*, vol. 23, pp. 3983-3943 (1990).

Example 1

Preparation of Polymerizable Liquid Crystal Composition Solution (MIX 1-1)

MIX 1

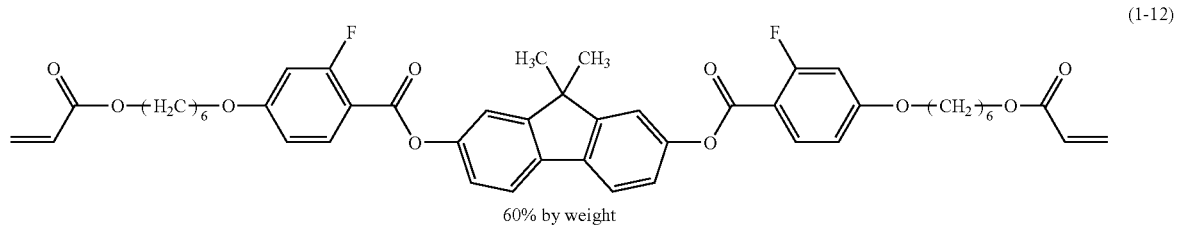

(1-12)

60% by weight

-continued

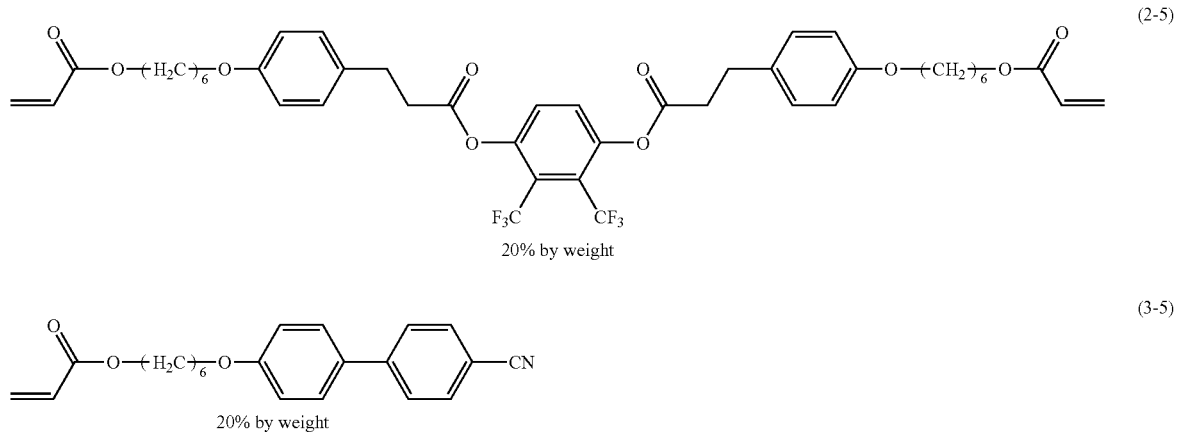

(2-5)

20% by weight (3-5)

20% by weight

Irgacure 907 (polymerization initiator, produced by Ciba Specialty Chemicals, Inc.) was added to the mixture MIX 1 in an amount of 1% by weight, and cyclopentanone was further added thereto in an amount of 300% by weight, to obtain a 25% by weight cyclopentanone solution. The solution was designated as a polymerizable liquid crystal composition solution (MIX 1-1).

Production of Optically Anisotropic Film

Figure 5:
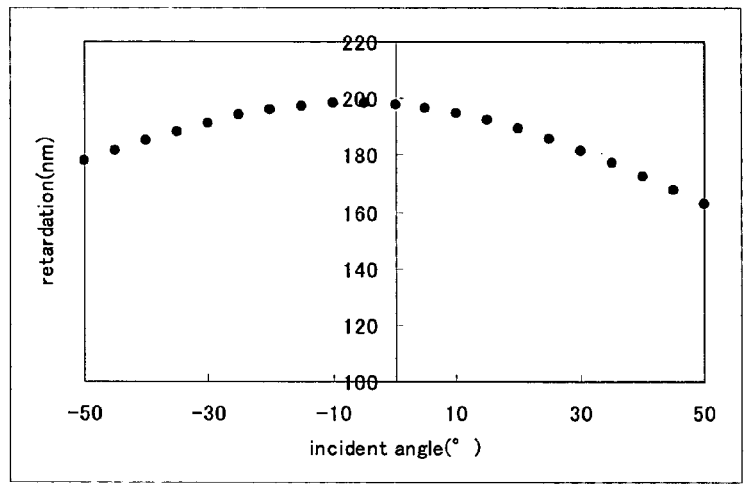
FIG. 5 is a diagram showing results of measurement of retardation of a glass substrate having a liquid crystal thin film obtained in Example 1 while the substrate is tilted from the perpendicular direction with respect to the film surface.

The polymerizable liquid crystal composition solution (MIX 1-1) was applied by a spin coating method on a glass substrate having an alignment layer subjected to a rubbing treatment, and after removing solvent by heating to 70° C. for 3 minutes to align the liquid crystal molecules, the composition was polymerized with an ultraviolet ray under a nitrogen stream to obtain a glass substrate having a liquid crystal film having homogeneous alignment. The glass substrate having a liquid crystal film was measured for retardation while tilting from the direction perpendicular to the film surface to the rubbing direction. The results obtained are shown in FIG. 5.

Comparative Example 1

Evaluation 1

Figure 6:
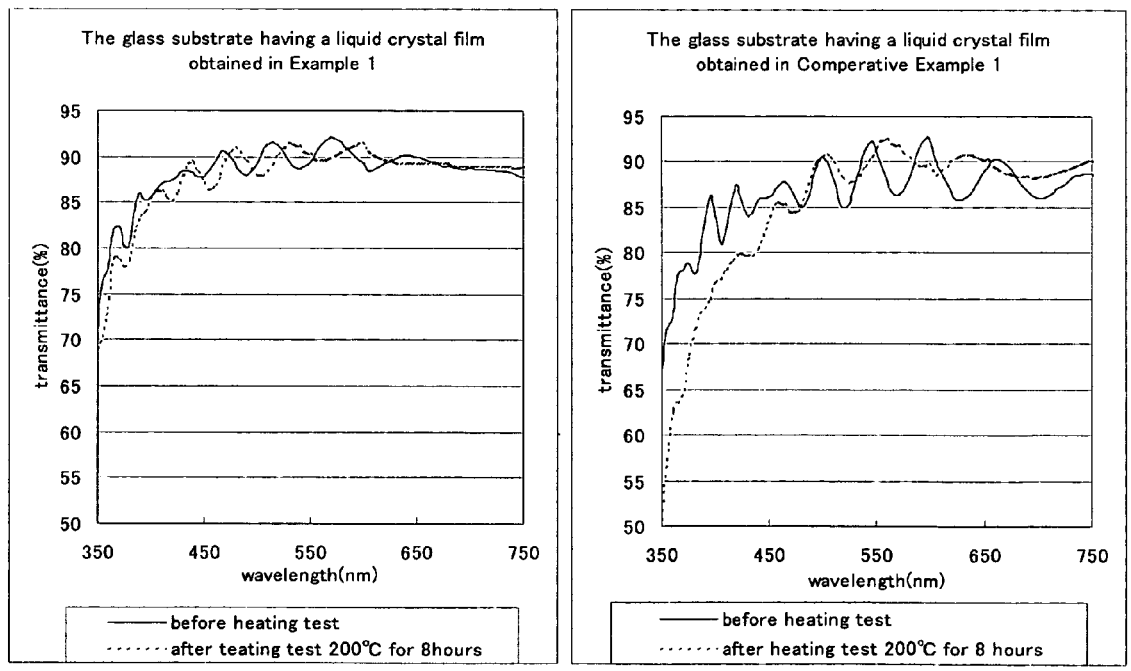
FIG. 6 is a diagram showing spectral transmittances obtained before and after applying glass substrates having a liquid crystal film obtained in Example 1 and Comparative Example 1 to a heat resistance test at 200° C. for 8 hours.

The glass substrates having a liquid crystal film obtained in Example 1 and Comparative Example 1 were measured for optical anisotropy Δn before the heating test, retardation before and after the heating test, change rate of thickness with respect to the initial value, and state of yellowing. The results are shown in Table 1 below. The glass substrates having a liquid crystal film after the heating test were measured for spectral transmittance characteristics. The results are shown in FIG. 6.

Example 2

Preparation of Polymerizable Liquid Crystal Composition Solution (MIX 2-1)

A composition containing 80% by weight of Compound (1-12) and 20% by weight of Compound (2-5) was designated as MIX 2. Irgacure 907 was added thereto in a weight ratio of 0.01, and cyclopentanone was further added thereto in a weight ratio of 3.0, to obtain a 25% by weight cyclopentanone solution. The solution was designated as a polymerizable liquid crystal composition solution (MIX 2-1).

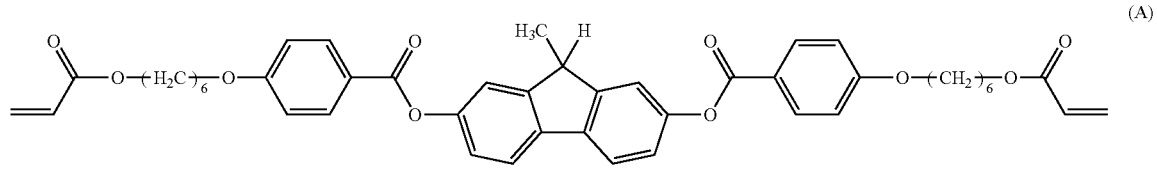

(A)

A polymerizable liquid crystal composition solution was prepared in the same manner as in Example 1 except that Compound (A) was used instead of Compound (1-12). An optical film having homogeneous alignment was obtained in the same manner as in Example 1 by using the resulting polymerizable liquid crystal composition solution. The glass substrate having a liquid crystal film had such a tilt angle dependency of retardation that was in the similar tendency as in Example 1. Compound (A) was synthesized as described in the method disclosed in JP-A-2003-238491.

The polymerizable liquid crystal composition solution (MIX 2-1) was applied by a spin coating method on a glass substrate having an alignment layer subjected to a rubbing treatment, and after removing solvent by heating to 70° C. for 3 minutes to align the liquid crystal molecules, the composition was polymerized with an ultraviolet ray under a nitrogen stream to obtain a glass substrate having a liquid crystal film having homogeneous alignment. The glass substrate having a liquid crystal film had such a tilt angle dependency of retardation that was in the similar tendency as in Example 1.

Comparative Example 2

A polymerizable liquid crystal composition solution was prepared in the same manner as in Example 2 except that Compound (A) was used instead of Compound (1-12). An optical film having homogeneous alignment was obtained in the same manner as in Example 2 by using the resulting polymerizable liquid crystal composition solution. The glass substrate having a liquid crystal film had such a tilt angle dependency of retardation that was in the similar tendency as in Example 1.

Evaluation 2

The glass substrates having a liquid crystal film obtained in Example 2 and Comparative Example 2 were measured for optical anisotropy Δn before the heating test, retardation before and after the heating test, change rate of thickness with respect to the initial value, and state of yellowing. The results are shown in Table 1 below.

Example 3

Preparation of Polymerizable Liquid Crystal Composition Solution (MIX 3-1)

A composition containing 70% by weight of Compound (1-12) and 30% by weight of Compound (3-5) was designated as MIX 3. Irgacure 907 was added thereto in a weight ratio of 0.01, and cyclopentanone was further added thereto in a weight ratio of 3.445, to obtain a 22.5% by weight cyclopentanone solution. The solution was designated as a polymerizable liquid crystal composition solution (MIX 3-1).

Figure 7:
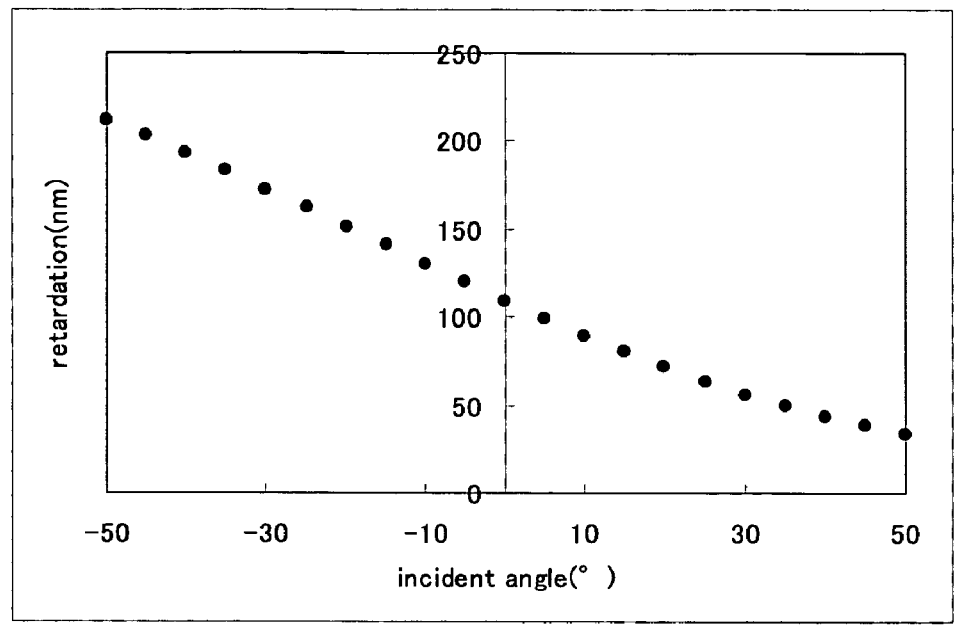
FIG. 7 is a diagram showing results of measurement of retardation of a glass substrate having a liquid crystal thin film obtained in Example 3 while the substrate is tilted from the perpendicular direction with respect to the film surface.

The polymerizable liquid crystal composition solution (MIX 3-1) was applied with a bar coater on a glass substrate having an alignment layer subjected to a rubbing treatment, and after removing solvent by heating to 70° C. for 3 minutes to align the liquid crystal molecules, the composition was polymerized with an ultraviolet ray under a nitrogen stream to obtain a glass substrate having a liquid crystal film having hybrid alignment. The glass substrate having a liquid crystal film was measured for retardation while tilting from the direction perpendicular to the film surface to the rubbing direction. The results obtained are shown in FIG. 7.

Comparative Example 3

A polymerizable liquid crystal composition solution was prepared in the same manner as in Example 3 except that Compound (A) was used instead of Compound (1-12). An optical film having hybrid alignment was obtained in the same manner as in Example 3 by using the resulting polymerizable liquid crystal composition solution. The glass substrate having a liquid crystal film had such a tilt angle dependency of retardation that was in the similar tendency as in Example 3.

Evaluation 3

The glass substrates having a liquid crystal film obtained in Example 3 and Comparative Example 3 were measured for retardation before and after the heating test, change rate of thickness with respect to the initial value, and state of yellowing. The results are shown in Table 1 below.

Example 4

Preparation of Polymerizable Liquid Crystal Composition Solution (MIX 4-1)

The following amino group-containing silicon compound was added in a weight ratio of 0.05 to the composition (MIX 1) prepared in Example 1, Irgacure 907 was added thereto in a weight ratio of 0.01, and cyclopentanone was further added thereto in a weight ratio of 3.0, to obtain a 25% by weight cyclopentanone solution. The solution was designated as a polymerizable liquid crystal composition solution (MIX 4-1).

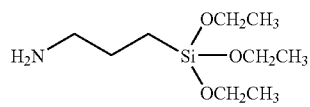

Figure 8:
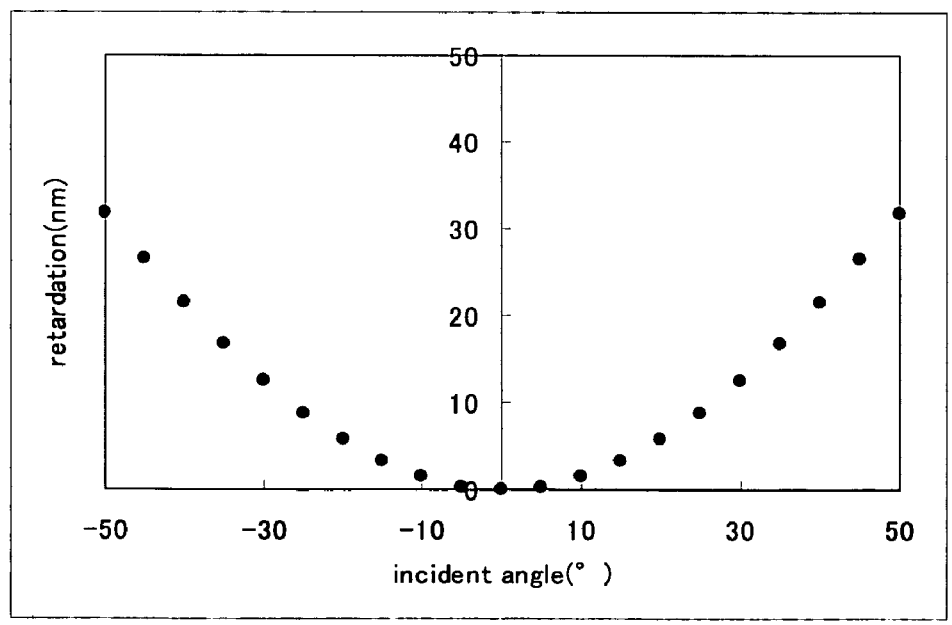
FIG. 8 is a diagram showing results of measurement of retardation of a glass substrate having a liquid crystal thin film obtained in Example 4 while the substrate is tilted from the perpendicular direction with respect to the film surface to the rubbing direction.

The polymerizable liquid crystal composition solution (MIX 4-1) was applied by a spin coating method on a glass substrate having an alignment layer subjected to a rubbing treatment, and after removing solvent by heating to 70° C. for 3 minutes to align the liquid crystal molecules, the composition was polymerized with an ultraviolet ray under a nitrogen stream to obtain a glass substrate having a liquid crystal film having homeotropic alignment. The glass substrate having a liquid crystal film was measured for retardation while tilting from the direction perpendicular to the film surface to the rubbing direction. The results obtained are shown in FIG. 8.

Comparative Example 4

A polymerizable liquid crystal composition solution was prepared in the same manner as in Example 4 except that Compound (A) was used instead of Compound (1-12), and the addition amount of the silicon compound was changed to a weight ratio of 0.1. An optical film having homeotropic alignment was obtained in the same manner as in Example 4 by using the resulting polymerizable liquid crystal composition solution. The glass substrate having a liquid crystal film had such a tilt angle dependency of retardation that was in the similar tendency as in Example 4.

Evaluation 4

The glass substrates having a liquid crystal film obtained in Example 4 and Comparative Example 4 were measured for retardation (50°) before and after the heating test, change rate of thickness with respect to the initial value, and state of yellowing. The results are shown in Table 1 below. The retardation (50°) was measured in such a manner that the resulting liquid crystal film was placed on a rotatable/tiltable stage, and the retardation was measured by tilting by 50° from the direction perpendicular to the film surface.

TABLE 1

(Evaluation Results of Liquid Crystal Films)

| | | Evaluation 1 | | Evaluation 2 | | Evaluation 3 | | Evaluation 4 | |
|---|---|---|---|---|---|---|---|---|---|
| | | Ex. 1 | C. Ex. 1 | Ex. 2 | C. Ex. 2 | Ex. 3 | C. Ex. 3 | Ex. 4 | C. Ex. 4 |
| Δn before heating | | 0.177 | 0.202 | 0.165 | 0.190 | — | — | — | — |
| Alignment state | | homogeneous | | homogeneous | | hybrid | | homeotropic | |
| | | Results of heating test at 200° C. | | | | | | | |
| Change rate of retardation (%) | 1 hr | −6 | −11 | −2 | −10 | −7 | −12 | — | — |
| | 3 hr | −8 | −16 | −3 | −15 | −9 | −18 | — | — |
| | 8 hr | −12 | −25 | −9 | −25 | −14 | −27 | — | — |
| Change rate of retardation (50°) (%) | 1 hr | — | — | — | — | — | — | −4 | −7 |
| | 3 hr | — | — | — | — | — | — | −7 | −11 |
| | 8 hr | — | — | — | — | — | — | −8 | −17 |
| Change rate of thickness (%) | 1 hr | −4 | −9 | −1 | −8 | −4 | −8 | −3 | −8 |
| | 3 hr | −5 | −10 | −1 | −10 | −5 | −11 | −4 | −9 |
| | 8 hr | −8 | −12 | −3 | −12 | −9 | −12 | −7 | −10 |
| State of yellowing* | 8 hr | A | B | A | B | A | B | A | B |

Note
*A: considerably small B: severely colored

It is understood from the results shown in Table 1 that the liquid crystal thin films produced by using the compositions of the invention, i.e., the liquid crystal thin films having homogeneous alignment (Examples 1 and 2), the liquid crystal thin film having hybrid alignment (Example 3) and the liquid crystal thin film having homeotropic alignment (Example 4), are small in reduction in thickness after heating at 200° C. and small in yellow coloring as compared to the liquid crystal thin films produced by using the compositions containing a compound having a monomethylfluorene skeleton as a major component.

Evaluation 5

Preparation of Polymerizable Liquid Crystal Composition Solution (MIX 5-1)

A liquid crystal thin film having particular optical anisotropy was formed on a prescribed area of a substrate.

A composition containing 75% by weight of Compound (1-12) and 25% by weight of Compound (2-5) was designated as MIX 4. Irgacure 651 was added thereto in a weight ratio of 0.01, BHT was added thereto in a weight ratio of 0.001 and cyclopentanone was further added thereto in a weight ratio of 3.0, to obtain a 25% by weight cyclopentanone solution. The solution was designated as a polymerizable liquid crystal composition solution (MIX 5-1). The polymerizable liquid crystal composition solution (MIX 5-1) was applied by a spin coating method on a glass substrate having an alignment layer subjected to a rubbing treatment, and after removing solvent by heating to 70° C. for 3 minutes to align the liquid crystal molecules, it was confirmed that the composition had an isotropic phase transition point of 69° C. by heating on a hot plate at a temperature increasing rate of 1° C. per minute.

Example 5

Figure 9:
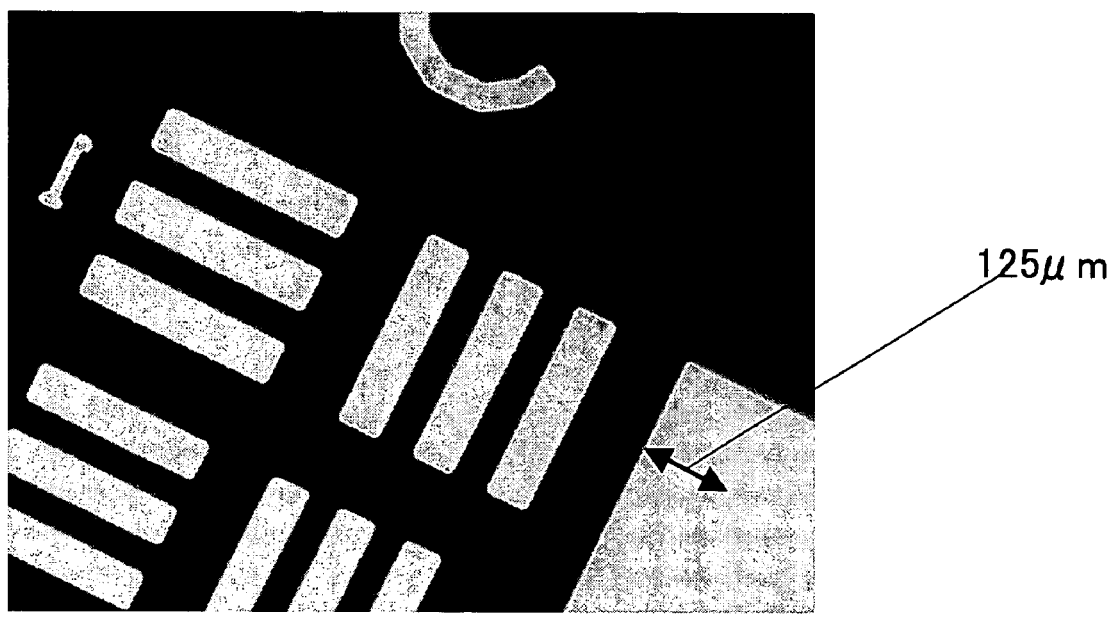
FIG. 9 is a diagram showing results of polarizing microscope observation of a glass substrate having a liquid crystal thin film obtained in Example 5.

The polymerizable liquid crystal composition solution (MIX 5-1) was applied by a spin coating method on a glass substrate having an alignment layer subjected to a rubbing treatment, and after removing solvent by heating to 70° C. for 3 minutes and allowing to stand at room temperature for 2 minutes to align the liquid crystal molecules, the composition was polymerized with an ultraviolet ray through a mask under a nitrogen stream. It was placed on a hot plate heated to 80° C. for 3 minutes and polymerized with an ultraviolet ray without a mask under a nitrogen stream while maintaining the heated state. FIG. 9 shows the result of observation with a polarizing microscope of the substrate. The bright part in FIG. 9 was an area that had not been shielded from light with the mask upon irradiating with an ultraviolet ray at room temperature, and had a retardation of 185 nm. Namely, it was confirmed that the part had optical anisotropy. The dark part in FIG. 9 was an area that had been shielded from light with the mask, and had a retardation of less than 1 nm. Namely, it was confirmed that the part did not have optical anisotropy. The mask used was a commercially available resolution test target (negative pattern), and was disposed on the substrate with a spacer obtained by boring a film having a thickness of about 50 μm intervening between them to prevent the mask from being in contact with the coated surface of the polymerizable liquid crystal.

Example 6

The polymerizable liquid crystal composition solution was allowed to stand at room temperature for 2 minutes to align the liquid crystal molecules, and polymerized with an ultraviolet ray without a mask under a nitrogen stream, in the same manner as in Example 5. The film was then immersed in acetone for 30 seconds. The film was observed with a polarizing microscope, and it was confirmed that the film had a bright part and a dark part as similar to FIG. 9 of Example 5. The bright part was an area that had not been shielded from light with the mask upon irradiating with an ultraviolet ray at room temperature, and in the area, the liquid crystal alignment was fixed and maintained without damage even after immersing the liquid crystal thin film in acetone. In the dark part, the liquid crystal alignment was not fixed. Namely, in the area, polymerization did not proceed since the area was shielded from light, and thus it was determined that the polymerizable liquid crystal materials were completely removed with acetone.

INDUSTRIAL APPLICABILITY

As described in the invention, such a liquid crystal thin film can be obtained that can be formed inside a liquid crystal cell and has heat resistance. The optically anisotropic liquid crystal thin film has an alignment state including homogeneous alignment, hybrid alignment or homeotropic alignment, and can be applied to compensation of a viewing angle of a liquid crystal display device of such a mode as a TN mode, an IPS mode, a VA mode, an OCB mode and an ASV mode.

What is claimed is:

1. A composition comprising a compound represented by Formula (1) and at least one of a compound represented by Formula (2) and a compound represented by Formula (3), with a proportion of the compound represented by Formula (1) being from 50 to 99% by weight, and a total proportion of the compound represented by Formula (2) and the compound represented by Formula (3) being from 1 to 50% by weight, based on a total amount of the compound represented by Formula (1), the compound represented by Formula (2) and the compound represented by Formula (3):

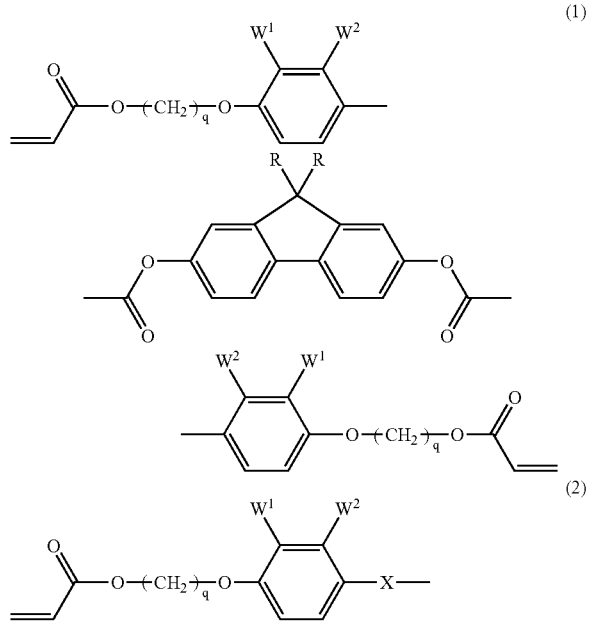

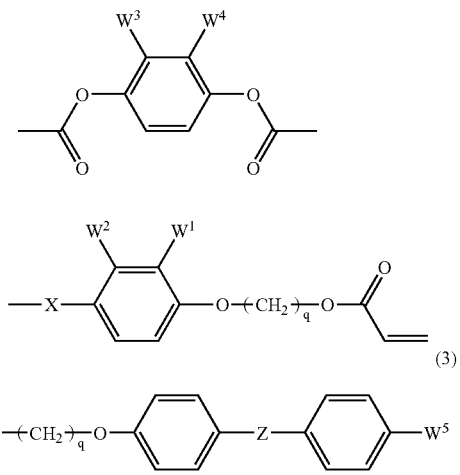

wherein R is alkyl having from 1 to 4 carbon atoms; each of $W^1$ and $W^2$ is independently hydrogen, chlorine, fluorine or —$CH_3$; each of $W^3$ and $W^4$ is independently hydrogen, chlorine, fluorine, —$CH_3$ or —$CF_3$; $W^5$ is alkyl having from 1 to 10 carbon atoms, alkoxy having from 1 to 10 carbon atoms, chlorine, fluorine, —CN or —$OCF_3$; X is a single bond, —CH=CH— or —$CH_2CH_2$—; Z is a single bond, —COO—, —OCO— or —$CH_2CH_2$—; and q is an integer of from 1 to 20.

2. A polymerizable liquid crystal composition comprising a compound represented by Formula (4) and at least one of a compound represented by Formula (5) and a compound represented by Formula (6), with a proportion of the compound represented by Formula (4) being from 50 to 90% by weight, and a total proportion of the compound represented by Formula (5) and the compound represented by Formula (6) being from 10 to 50% by weight, based on a total amount of the compound represented by Formula (4), the compound represented by Formula (5) and the compound represented by Formula (6):

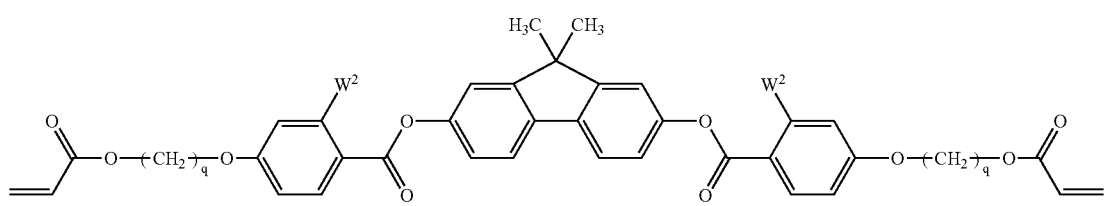

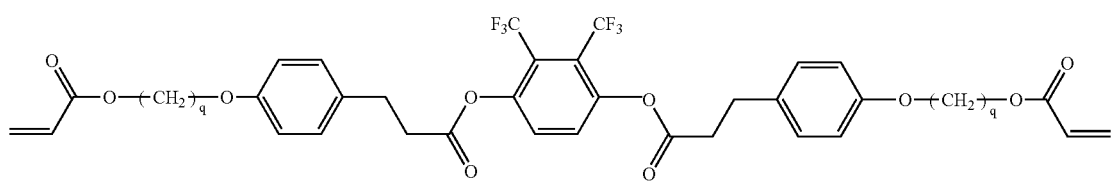

-continued

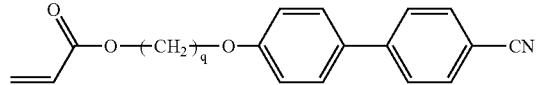
(6)

wherein W² is hydrogen or fluorine; and q is an integer of from 2 to 10.

3. The polymerizable liquid crystal composition according to claim 2, wherein the proportion of the compound represented by Formula (4) is from 50 to 80% by weight, the proportion of the compound represented by Formula (5) is from 10 to 40% by weight, the proportion of the compound represented by Formula (6) is from 10 to 40% by weight, and the total proportion of the compound represented by Formula (5) and the compound represented by Formula (6) is from 20 to 50% by weight.

4. The polymerizable liquid crystal composition according to claim 2, wherein the proportion of the compound represented by Formula (4) is from 50 to 80% by weight, the proportion of the compound represented by Formula (5) is from 10 to 40% by weight, the proportion of the compound represented by Formula (6) is from 10 to 40% by weight, the total proportion of the compound represented by Formula (5) and the compound represented by Formula (6) is from 20 to 50% by weight, and W² is hydrogen.

5. The polymerizable liquid crystal composition according to claim 2, wherein the proportion of the compound represented by Formula (4) is from 50 to 90% by weight, the proportion of the compound represented by Formula (5) is from 10 to 50% by weight, and the proportion of the compound represented by Formula (6) is 0% by weight.

6. The polymerizable liquid crystal composition according to claim 2, wherein the proportion of the compound represented by Formula (4) is from 50 to 90% by weight, the proportion of the compound represented by Formula (5) is 0% by weight, the proportion of the compound represented by Formula (6) is from 10 to 50% by weight.

7. The polymerizable liquid crystal composition according to claim 1, wherein the composition further comprises a compound represented by Formula (7), and a proportion of the compound represented by Formula (7) is from 1 to 20% by weight based on the total weight of the composition:

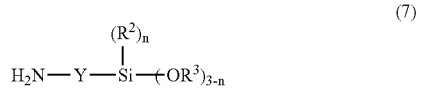
(7)

wherein R is alkyl having from 1 to 8 carbon atoms; R³ is alkyl having from 1 to 8 carbon atoms; Y is alkylene having from 1 to 20 carbon atoms; and n is an integer of from 0 to 2.

8. The polymerizable liquid crystal composition according to claim 2, wherein the composition further comprises a compound represented by Formula (7), and a proportion of the compound represented by Formula (7) is from 1 to 20% by weight based on the total weight of the composition:

$$\underset{H_2N-Y-\underset{|}{Si}-(OR^3)_{3-n}}{(R^2)_n} \quad (7)$$

wherein R² is alkyl having from 1 to 8 carbon atoms; R³ is alkyl having from 1 to 8 carbon atoms; Y is alkylene having from 1 to 20 carbon atoms; and n is an integer of from 0 to 2.

9. The polymerizable liquid crystal composition according to claim 8, wherein Y is trimethylene, R³ is ethyl, and n is 0; and the proportion of the compound represented by Formula (7) is from 1 to 10% by weight.

10. A polymerizable liquid crystal layer formed by applying the polymerizable liquid crystal composition of claim 1 on a glass substrate.

11. The polymerizable liquid crystal layer according to claim 10, wherein the glass substrate is a glass substrate having a treated surface.

12. The polymerizable liquid crystal layer according to claim 11, wherein the glass substrate having a treated surface is a glass substrate having a polyimide alignment layer subjected to a rubbing treatment.

13. A polymerizable liquid crystal layer formed by applying the polymerizable liquid crystal composition of claim 2 on a glass substrate having a polyimide alignment layer subjected to a rubbing treatment.

14. A polymerizable liquid crystal layer formed by applying the polymerizable liquid crystal composition of claim 3 on a glass substrate having a polyimide alignment layer subjected to a rubbing treatment, and having an alignment state of homogeneous alignment.

15. A polymerizable liquid crystal layer formed by applying the polymerizable liquid crystal composition of claim 4 on a glass substrate having a polyimide alignment layer subjected to a rubbing treatment, and having an alignment state of homogeneous alignment.

16. A polymerizable liquid crystal layer formed by applying the polymerizable liquid crystal composition of claim 5 on a glass substrate having a polyimide alignment layer subjected to a rubbing treatment, and having an alignment state of homogeneous alignment.

17. A polymerizable liquid crystal layer formed by applying the polymerizable liquid crystal composition of claim 6 on a glass substrate having a polyimide alignment layer subjected to a rubbing treatment, and having an alignment state of hybrid alignment.

18. A polymerizable liquid crystal layer comprising the polymerizable liquid crystal composition of claim 8 on a glass substrate, and having an alignment state of homeotropic alignment.

19. An optically anisotropic liquid crystal thin film having fixed alignment obtained by polymerizing the polymerizable liquid crystal layer of claim 13.

20. The optically anisotropic liquid crystal thin film according to claim 19, wherein the thickness of the film is from 0.05 to 5 μm.

21. An optical device comprising the optically anisotropic liquid crystal thin film of claim 19.

22. A phase retardation plate comprising the optically anisotropic liquid crystal thin film of claim 19.

23. A polarizing plate comprising the optically anisotropic liquid crystal thin film of claim 19.

24. An optical device comprising the phase retardation plate of claim 22.

25. An optical device comprising the polarizing plate of claim 23.

26. A display device comprising the phase retardation plate of claim 22.

27. A display device comprising the polarizing plate of claim 23.

28. A liquid crystal display device comprising the phase retardation plate of claim 22.

29. A liquid crystal display device comprising the polarizing plate of claim 23.

30. A liquid crystal display device comprising the optically anisotropic liquid crystal thin film of claim 19 formed on an inner surface of a liquid crystal cell.

* * * * *